US008090011B2

(12) United States Patent
Asami

(10) Patent No.: US 8,090,011 B2
(45) Date of Patent: Jan. 3, 2012

(54) MEASURING APPARATUS, MEASURING METHOD, RECORDING MEDIUM, AND TEST APPARATUS

(75) Inventor: Koji Asami, Tokyo (JP)

(73) Assignee: Advantest Corporation, Tokyo (JP)

( * ) Notice: Subject to any disclaimer, the term of this patent is extended or adjusted under 35 U.S.C. 154(b) by 878 days.

(21) Appl. No.: 11/952,126

(22) Filed: Dec. 6, 2007

(65) Prior Publication Data
US 2009/0180527 A1 Jul. 16, 2009

Related U.S. Application Data

(63) Continuation of application No. PCT/JP2007/069871, filed on Oct. 11, 2007.

(30) Foreign Application Priority Data

Oct. 17, 2006 (JP) ................................. 2006-283013

(51) Int. Cl.
*H04B 17/00* (2006.01)
(52) U.S. Cl. ........ 375/226; 375/130; 375/135; 375/136; 375/147; 375/148; 375/213; 375/224; 375/261; 375/268; 375/269; 375/271; 375/279; 375/298; 375/300; 375/320; 375/348
(58) Field of Classification Search .................. 375/226, 375/343, 130, 135, 136, 146, 147, 213, 224, 375/261, 268, 269, 298, 320, 348; 702/79, 702/85, 108, 127; 324/555
See application file for complete search history.

(56) References Cited

U.S. PATENT DOCUMENTS 5,852,630 A * 12/1998 Langberg et al. ............. 375/219
7,123,896 B2 * 10/2006 Chiu ............................. 455/313
7,639,756 B2 * 12/2009 Niwa et al. .................... 375/298
7,783,273 B2 * 8/2010 Maeda et al. ................. 455/285
7,831,220 B2 * 11/2010 Hammerschmidt et al. ......................... 455/114.1
7,848,453 B2 * 12/2010 Pan .............................. 375/298

FOREIGN PATENT DOCUMENTS

JP 4-274642 9/1992
JP 5-130156 5/1993
JP 5-136836 6/1993

OTHER PUBLICATIONS

Article titled "Technical Feature", adopted from Microwave Journal, Jan. 2000, p. 38.

* cited by examiner

*Primary Examiner* — Dhaval Patel
(74) *Attorney, Agent, or Firm* — Jianq Chyun IP Office

(57) ABSTRACT

Provided is a measuring apparatus which measures a quadrature modulator, including a supplying section supplying the quadrature modulator with a reference I signal having a predetermined frequency and a reference Q signal whose phase is shifted by 90 degrees from the reference I signal, an extracting section extracting, from a modulation signal output from the quadrature modulator by applying quadrature modulation to the reference IQ signals, a main signal component as the reference IQ signals modulated, and an image signal component occurring at a position symmetric to the modulated reference IQ signals with respect to the carrier signal, and a measurement value calculating section calculating at least one of a carrier phase error and amplitude error which occur between I signal and Q signal sides of the quadrature modulator, and a skew between IQ signals of the quadrature modulator, based on the main signal component and image signal component.

19 Claims, 19 Drawing Sheets

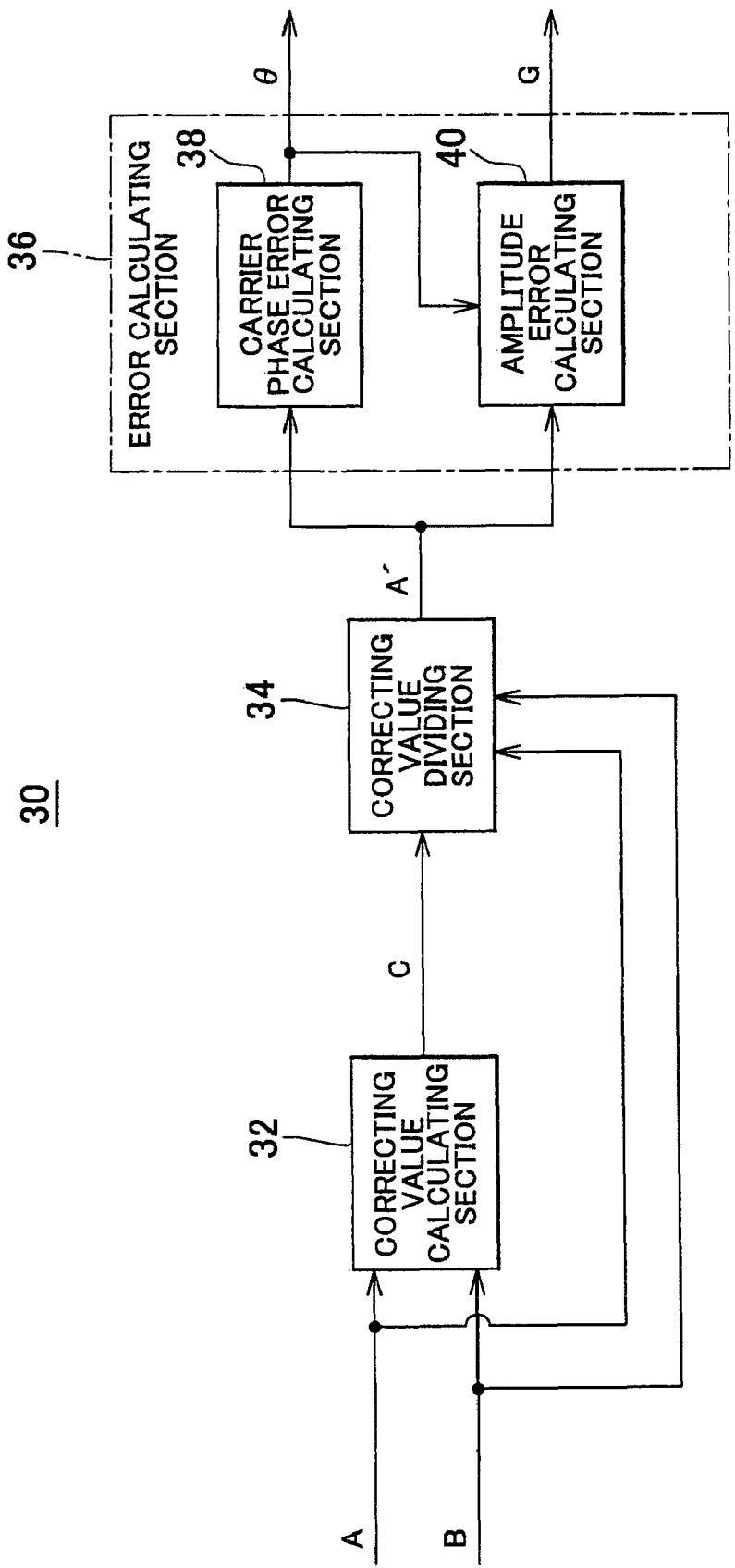
F I G . 4

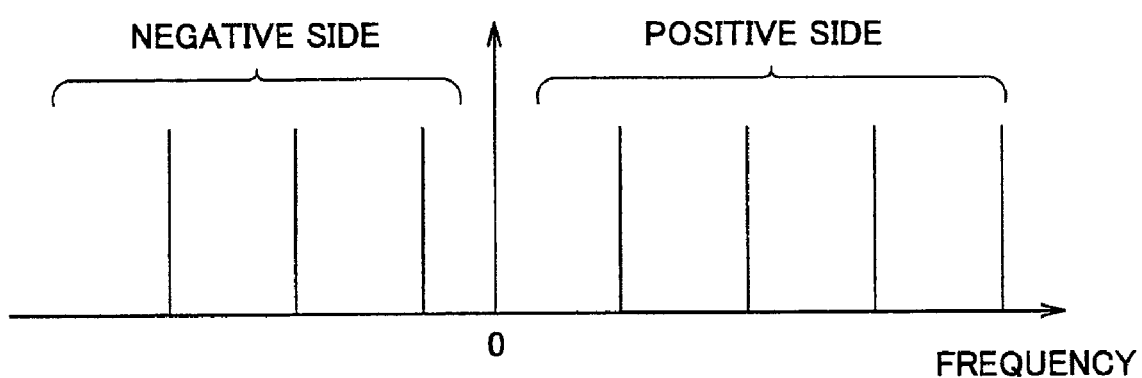
F I G . 7

MEASURING APPARATUS, MEASURING METHOD, RECORDING MEDIUM, AND TEST APPARATUS

CROSS REFERENCE TO RELATED APPLICATION

This is a continuation application of PCT/JP2007/069871 filed on Oct. 11, 2007 which claims priority from a Japanese Patent Application(s)
NO. 2006-283013 filed on Oct. 17, 2006,
the contents of which are incorporated herein by reference.

BACKGROUND

1. Technical Field

The present invention relates to a measuring apparatus, a measuring method, a recording medium, and a test apparatus. Particularly, the present invention relates to a measuring apparatus, a measuring method, a recording medium, and a test apparatus for measuring a quadrature modulator.

2. Related Art

A signal output from a quadrature modulator or a quadrature demodulator includes a carrier phase error (also called quadrature error) that occurs between the I signal side and Q signal side of the quadrature modulator or the quadrature demodulator, an amplitude error (also called gain error) that occurs between the I signal side and Q signal side, and an error according to a skew between an I signal and a Q signal. Non-Patent Literature 1 describes a method for measuring these errors in the quadrature modulator. This method supplies a complex sine wave signal to the quadrature modulator, which is the object of measurement, detects a modulated signal output from the quadrature modulator, and displays a Lissajous waveform of the detected signal on an oscilloscope or the like. Then, this method calculates an amplitude error based on the ratio between the longer diameter and shorter diameter of an ellipse of the Lissajous waveform displayed on the oscilloscope or the like, and calculates a carrier phase error based on the angle of the ellipse.

[Non-Patent Literature 1] "TECHNICAL FEATURE", MICROWAVE JOURNAL, USA, Horizon House Publications INC, January 2000, page 38.

However, since the longer diameter and shorter diameter and the angle of an ellipse have to be calculated, the method described in Non-Patent Literature 1 cannot precisely calculate a carrier phase error and an amplitude error. Further, the quadrature modulator and the quadrature demodulator will produce a greater impact from an error according to a skew, in a case where the signal to be processed is several ten MHz to several hundred MHz or larger. However, the method described in Non-Patent Literature 1 cannot measure a skew.

SUMMARY

Hence, according to one aspect of the innovation included herein, an object is to provide a measuring apparatus, a measuring method, a recording medium, and a test apparatus which can solve the above-described problem. This object will be achieved by combination of features recited in independent claims. Dependent claims will define additional advantageous specific examples of the present invention.

That is, according to one exemplary measuring apparatus according to a first aspect relating to the innovation included herein, there is provided a measuring apparatus which measures a quadrature modulator for applying quadrature modulation to an I signal and a Q signal input thereto by a carrier signal having a carrier frequency, the measuring apparatus including: a supplying section which supplies the quadrature modulator with a reference I signal having a predetermined frequency and a reference Q signal whose phase is shifted by 90 degrees from the reference I signal, wherein the I signal and the Q signal are respectively the in-phase and quadrature phase signal; an extracting section which extracts, from a modulation signal output from the quadrature modulator as a result of applying quadrature modulation to the reference I signal and the reference Q signal, a main signal component which is a result of modulating the reference I signal and the reference Q signal, and an image signal component which occurs at a position symmetric to the modulated reference I signal and reference Q signal with respect to the carrier signal; and a measurement value calculating section which calculates at least one of a carrier phase error which occurs between an I signal side and a Q signal side of the quadrature modulator an amplitude error between the I signal side and the Q signal side of the quadrature modulator and a skew between an I signal and a Q signal of the quadrature modulator based on the main signal component and the image signal component.

According to one exemplary measuring apparatus according to a second aspect relating to the innovation included herein, there is provided a measuring apparatus which measures a quadrature demodulator for outputting an I signal and a Q signal by applying quadrature demodulation to an input signal by a carrier signal having a carrier frequency, the measuring apparatus including: a supplying section which supplies the quadrature demodulator with a reference modulation signal obtained by applying quadrature modulation to a reference I signal having a predetermined frequency and a reference Q signal whose phase is shifted by 90 degrees from the reference I signal; an extracting section which extracts, from a demodulation signal output from the quadrature demodulator as a result of applying quadrature demodulation to the reference modulation signal, a main signal component which is a result of modulating the reference I signal and the reference Q signal, and an image signal component which occurs at a position symmetric to the reference I signal demodulated and the reference Q signal demodulated with respect to the carrier signal; and a measurement value calculating section which calculates at least one of a carrier phase error which occurs between an I signal side and a Q signal side of the quadrature demodulator, an amplitude error between the I signal side and the Q signal side of the quadrature demodulator, and a skew between an I signal and a Q signal of the quadrature demodulator.

According to one exemplary measuring method according to a third aspect relating to the innovation included herein, there is provided a measuring method for measuring a quadrature modulator which applies quadrature modulation to an I signal and a Q signal input thereto by a carrier signal having a carrier frequency, the measuring method including: supplying the quadrature modulator with a reference I signal having a predetermined frequency and a reference Q signal whose phase is shifted by 90 degrees from the reference I signal; extracting, from a modulation signal output from the quadrature modulator as a result of applying quadrature modulation to the reference I signal and the reference Q signal, a main signal component which is a result of modulating the reference I signal and the reference Q signal, and an image signal component which occurs at a position symmetric to the modulated reference I signal and reference Q signal with respect to the carrier signal; and calculating at least one of a carrier phase error which occurs between an I signal side and a Q signal side of the quadrature modulator, an amplitude error between the I signal side and the Q signal side of the quadrature modulator, and a skew between an I signal and a Q signal of the quadrature modulator, based on the main signal component and the image signal component.

According to one exemplary measuring method according to a fourth aspect of the innovation included herein, there is provided a measuring method for measuring a quadrature demodulator which outputs an I signal and a Q signal by applying quadrature demodulation to an input signal by a carrier signal having a carrier frequency, the measuring method including: supplying the quadrature demodulator with a reference modulation signal obtained by applying quadrature modulation to a reference I signal having a predetermined frequency and a reference Q signal whose phase is shifted by 90 degrees from the reference I signal; extracting, from a demodulation signal output from the quadrature demodulator as a result of applying quadrature demodulation to the reference modulation signal, a main signal component which is a result of modulating the reference I signal and the reference Q signal, and an image signal component which occurs at a position symmetric to the reference I signal demodulated and the reference Q signal demodulated with respect to the carrier signal; and calculating at least one of a carrier phase error which occurs between an I signal side and a Q signal side of the quadrature demodulator, an amplitude error between the I signal side and the Q signal side of the quadrature demodulator, and a skew between an I signal and a Q signal of the quadrature demodulator, based on the main signal component and the image signal component.

According to one exemplary recording medium according to a fifth aspect relating to the innovation included herein, there is provided a recording medium storing a program for controlling a computer to function as a measuring apparatus which measures a quadrature modulator for applying quadrature modulation to an I signal and a Q signal input thereto by a carrier signal having a carrier frequency, the program controlling the computer to function as: a supplying section which supplies the quadrature modulator with a reference I signal having a predetermined frequency and a reference Q signal whose phase is shifted by 90 degrees from the reference I signal; an extracting section which extracts, from a modulation signal output from the quadrature modulator as a result of applying quadrature modulation to the reference I signal and the reference Q signal, a main signal component which is a result of modulating the reference I signal and the reference Q signal, and an image signal component which occurs at a position symmetric to the modulated reference I signal and reference Q signal with respect to the carrier signal; and a measurement value calculating section which calculates at least one of a carrier phase error which occurs between an I signal side and a Q signal side of the quadrature modulator, an amplitude error between the I signal side and the Q signal side of the quadrature modulator, and a skew between an I signal and a Q signal of the quadrature modulator, based on the main signal component and the image signal component.

According to one exemplary recording medium according to a sixth aspect relating to the innovation included herein, there is provided a recording medium storing a program for controlling a computer to function as a measuring apparatus which measures a quadrature demodulator for outputting an I signal and a Q signal by applying quadrature demodulation to an input signal by a carrier signal having a carrier frequency, the program controlling the computer to function as: a supplying section which supplies the quadrature demodulator with a reference modulation signal obtained by applying quadrature modulation to a reference I signal having a predetermined frequency and a reference Q signal whose phase is shifted by 90 degrees from the reference I signal; an extracting section which extracts, from a demodulation signal output from the quadrature demodulator as a result of applying quadrature demodulation to the reference modulation signal, a main signal component which is a result of modulating the reference I signal and the reference Q signal, and an image signal component which occurs at a position symmetric to the reference I signal demodulated and the reference Q signal demodulated with respect to the carrier signal; and a measurement value calculating section which calculates at least one of a carrier phase error which occurs between an I signal side and a Q signal side of the quadrature demodulator, an amplitude error between the I signal side and the Q signal side of the quadrature demodulator, and a skew between an I signal and a Q signal of the quadrature demodulator, based on the main signal component and the image signal component.

According to one exemplary test apparatus according to a seventh aspect relating to the innovation included herein, there is provided a test apparatus which tests a device under test, including: a quadrature modulator which supplies the device under test with a quadrature modulation signal obtained by applying quadrature modulation to an I signal and a Q signal input to the quadrature modulator by a carrier signal having a carrier frequency; a detecting section which detects an output signal output from the device under test in response to the quadrature modulation signal; a judging section which judges whether the output signal detected by the detecting section is a pass or a failure; a measuring apparatus which measures the quadrature modulator; and a calibration section which calibrates the quadrature modulator according to a measurement by the measuring apparatus, wherein the measuring apparatus includes: a supplying section which supplies the quadrature modulator with a reference I signal having a predetermined frequency and a reference Q signal whose phase is shifted by 90 degrees from the reference I signal; an extracting section which extracts, from a modulation signal output from the quadrature modulator as a result of applying quadrature modulation to the reference I signal and the reference Q signal, a main signal component which is a result of modulating the reference I signal and the reference Q signal, and an image signal component which occurs at a position symmetric to the modulated reference I signal and reference Q signal with respect to the carrier signal; and a measurement value calculating section which calculates at least one of a carrier phase error which occurs between an I signal side and a Q signal side of the quadrature modulator, an amplitude error between the I signal side and the Q signal side of the quadrature modulator, and a skew between an I signal and a Q signal of the quadrature modulator based on the main signal component and the image signal component.

According to one exemplary test apparatus according to an eighth aspect relating to the innovation included herein, there is provided a test apparatus which tests a device under test, including: a signal output section which outputs a test signal to the device under test to cause the device under test to output an output signal which is a result of applying quadrature modulation to the test signal; a quadrature demodulator which outputs an I signal and a Q signal by applying quadrature demodulation by a carrier signal having a carrier frequency to the output signal output from the device under test in response to the test signal; a judging section which judges whether the I signal and the Q signal output from the quadrature demodulator are a pass or a failure; a measuring apparatus which measures the quadrature demodulator; and a calibration section which calibrates the quadrature demodulator according to a measurement by the measuring apparatus, wherein the measuring apparatus includes: a supplying section which supplies the quadrature demodulator with a reference modulation signal obtained by applying quadrature modulation to a reference I signal having a predetermined frequency and a reference Q signal whose phase is shifted by 90 degrees from the reference I signal; an extracting section which extracts, from a demodulation signal output from the quadrature demodulator as a result of applying quadrature demodulation to the reference modulation signal, a main signal component which is a result of modulating the reference I signal and the reference Q signal, and an image signal component which occurs at a position symmetric to the reference I signal demodulated and the reference Q signal demodulated with respect to the carrier signal; and a measurement value calculating section which calculates at least one of a carrier phase error which occurs between an I signal side and a Q signal side of the quadrature demodulator, an amplitude error between the I signal side and the Q signal side of the quadrature demodulator, and a skew between an I signal and a Q signal of the quadrature demodulator, based on the main signal component and the image signal component.

The above summary of the invention is not intended to list all necessary features of the present invention, but sub-combinations of these features can also provide an invention.

BRIEF DESCRIPTION OF THE DRAWINGS

FIG. 4 shows one example of the configuration an error measuring section 30 according to the embodiment of the present invention.

FIG. 7 shows one example of a frequency characteristic of a plurality of reference I signals and reference Q signals which are distributed in frequency ranges on the positive side and negative side of a carrier signal.

DESCRIPTION OF EXEMPLARY EMBODIMENTS

One aspect of the present invention will be explained below through an embodiment of the invention, but the embodiment below is not intended to limit the invention set forth in the claims, or all combinations of the features explained in the embodiment are not necessarily essential to the means of solving provided by the invention.

Figure 1:
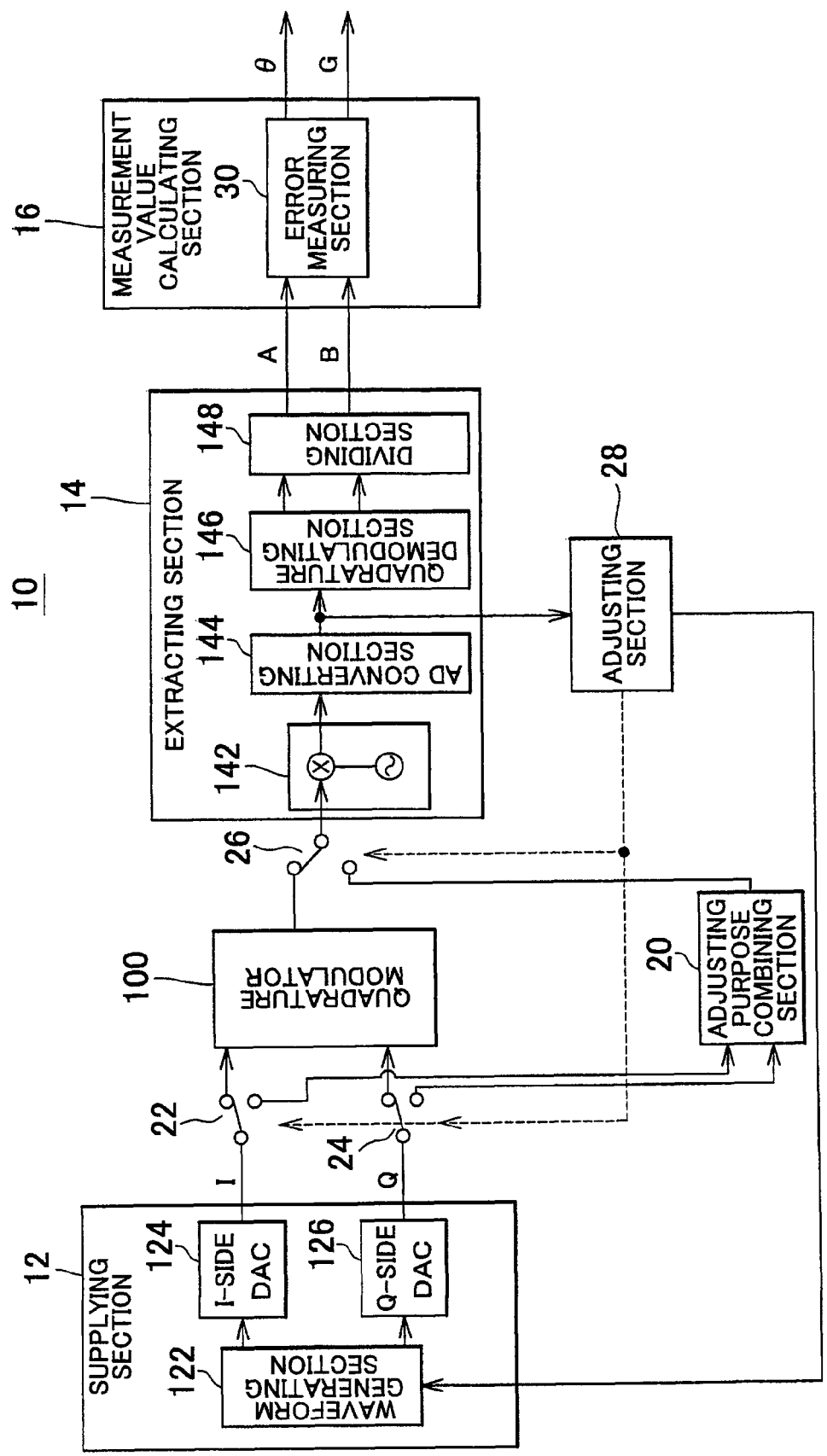
FIG. 1 shows one example of the configuration of a measuring apparatus 10 according to an embodiment of the present invention, together with a quadrature modulator 100.

FIG. 1 shows one example of the configuration of a measuring apparatus 10 according to the present embodiment, together with a quadrature modulator 100. The measuring apparatus 10 according to the present example measures a quadrature modulator 100 which applies quadrature modulation to an I signal and a Q signal input thereto by a carrier signal having a carrier frequency. To be more specific, the measuring apparatus 10 according to the present example measures at least one of a carrier phase error that occurs between the I signal side and Q signal side of the quadrature modulator 100 and an amplitude error that occurs between the I signal side and Q signal side of the quadrature modulator 100.

The measuring apparatus 10 includes a supplying section 12, an extracting section 14, a measurement value calculating section 16, an adjusting purpose combining section 20, an I-side output switching section 22, a Q-side output switching section 24, and an input switching section 26. The supplying section 12 supplies the quadrature modulator 100 with a reference I signal having a predetermined frequency and a reference Q signal whose phase is shifted by 90 degrees from the reference I signal.

For example, the supplying section 12 may supply the quadrature modulator 100 with a reference I signal ($Cos(\omega_0 t)$)

and a reference Q signal (Sin($\omega_0$t)), which are sine waveforms having an angular frequency $\omega_0$. Further, for example, the supplying section 12 may supply the quadrature modulator 100 with a reference I signal and a reference Q signal which have a single frequency (hereinafter also referred to as monotone signal). Furthermore, the supplying section 12 may supply the quadrature modulator 100 with an I signal obtained by adding a plurality of reference I signals which are sine waves having different frequencies, and a Q signal obtained by adding a plurality of reference Q signals which are sine waves whose phase is shifted by 90 degrees with respect to the plurality of reference I signals respectively (hereinafter also referred to as multi-tone signal). When supplied with the reference I signal and the reference Q signal from the supplying section 12, the quadrature modulator 100 outputs a modulation signal obtained by applying quadrature modulation to these signals using a carrier signal. The reference I signal and the reference Q signal will hereinafter be referred to as reference IQ signals collectively.

For example, the supplying section 12 may include a waveform generating section 122, an I-side DAC 124, and a Q-side DAC 126. The waveform generating section 122 generates waveform data representing reference IQ signals. The I-side DAC 124 converts the waveform data of the reference I signal generated by the waveform generating section 122 from digital to analog, and outputs the reference I signal turned to an analog signal. The Q-side DAC 126 converts the waveform data of the reference Q signal generated by the waveform generating section 122 from digital to analog, and outputs the reference Q signal turned to an analog signal.

The extracting section 14 receives the modulation signal output from the quadrature modulator 100 as a result of quadrature modulation of the reference IQ signals (reference I signal and reference Q signal) from the quadrature modulator 100. The extracting section 14 extracts a main signal component A included in the received modulation signal, which is the result of modulating the reference IQ signals (reference I signal and reference Q signal), and an image signal component B included in the received modulation signal, which occurs at a position symmetric to the modulated reference IQ signals (reference I signal and reference Q signal) with respect to the carrier signal. For example, in a case where the angular frequency of the reference IQ signals is $\omega_0$ and the angular frequency of the carrier signal is $\omega_C$, the extracting section 14 extracts a frequency component having an angular frequency ($\omega_C+\omega_0$) included in the modulation signal output from the quadrature modulator 100, as the main signal component A. Further, in this case, the extracting section 14 extracts a frequency component having an angular frequency ($\omega_C-\omega_0$) included in the modulation signal output from the quadrature modulator 100, as the image signal component B. Further, in a case where multi-tone signals are supplied to the quadrature modulator 100, the extracting section 14 may extract main signal components A and image signal components B which correspond to the respective frequencies.

For example, the extracting section 14 may include a down-converter 142, an AD converting section 144, a quadrature demodulating section 146, and a dividing section 148. The down-converter 142 down-converts the carrier frequency of the modulation signal output from the quadrature modulator 100 to an intermediate frequency. The AD converting section 144 digitalizes the modulation signal output from the down-converter 142 by sampling the modulation signal. Note that the AD converting section 144 may directly sample and digitalize the modulation signal output from the quadrature modulator 100 without letting the signal through the down-converter 142.

The quadrature demodulating section 146 applies quadrature demodulation by digital operation to the modulation signal digitalized by the AD converting section 144, and outputs the baseband signal. Since the quadrature demodulating section 146 performs digital operation, a carrier phase error, an amplitude error, and an error according to a skew are very small.

The dividing section 148 extracts the main signal component A and the image signal component B from the baseband signal output from the quadrature demodulating section 146. For example, in a case where the angular frequency of the reference IQ signals is $\omega_0$, the dividing section 148 extracts a frequency component of the baseband signal whose angular frequency is ($\omega_0$) as the main signal component A, and extracts a frequency component whose angular frequency is ($-\omega_0$) as the image signal component B. In a case where monotone signals are supplied to the quadrature modulator 100, the dividing section 148 may, for example, extract the main signal component A and the image signal component B by filtering the baseband signal. Further, in a case where multi-tone signals are supplied to the quadrature modulator 100, the dividing section 148 may, for example, extract a plurality of main signal components A obtained as a result of modulating a plurality of reference IQ signals, and a plurality of image signal components B which occur at positions symmetric to the modulated reference IQ signals with respect to the carrier signal, by performing Fourier transform operation (for example, FFT operation) of the baseband signal.

The measurement value calculating section 16 includes an error measuring section 30. The error measuring section 30 receives the main signal component A and the image signal component B extracted by the extracting section 14. Then, the error measuring section 30 calculates at least one of a carrier phase error and an amplitude error in the quadrature modulator 100, based on the main signal component A and the image signal component B.

The adjusting purpose combining section 20 supplies the extracting section 14 with a signal obtained by combining the reference I signal and the reference Q signal output from the supplying section 12, during an adjustment operation performed prior to the measurement of a carrier phase error and an amplitude error. For example, the adjusting purpose combining section 20 may supply the extracting section 14 with a signal obtained by adding the reference I signal and the reference Q signal. The I-side output switching section 22 switches the destination to where an adjustment I signal output from the supplying section 12 is to be output, between the quadrature modulator 100 and the adjusting purpose combining section 20. The I-side output switching section 22 supplies the reference I signal to the quadrature modulator 100 during a measurement operation, and supplies the reference I signal to the adjusting purpose combining section 20 during an adjustment operation.

The Q-side output switching section 24 switches the destination to where an adjustment Q signal output from the supplying section 12 is to be supplied, between the quadrature modulator 100 and the adjusting purpose combining section 20. The Q-side output switching section 24 supplies the reference Q signal to the quadrature modulator 100 during a measurement operation, and supplies the reference Q signal to the adjusting purpose combining section 20 during an adjustment operation. The input switching section 26 switches the source of the signal to be input to the extracting section 14, between the quadrature modulator 100 and the adjusting purpose combining section 20. The input switching section 26 supplies the modulation signal output from the quadrature modulator 100 to the extracting section 14 during a measurement operation, and supplies a signal obtained by the adjusting purpose combining section 20 by combining the reference IQ signals to the extracting section 14 during an adjustment operation.

An adjusting section 28 adjusts the reference IQ signals output from the supplying section 12 during an adjustment operation. For example, the adjusting section 28 adjusts the supplying section 12 such that a frequency error, a phase error, an amplitude error, a waveform distortion, etc. of the reference I signal (Cos($\omega_0$t)) and reference Q signal (Sin ($\omega_0$t)), which are sine waveforms having an angular frequency $\omega_0$, become small. For example, the adjusting section 28 may adjust the reference IQ signals to be output from the supplying section 12, based on a measurement of the combined signal from the adjusting purpose combining section 20, which has been converted from analog to digital.

Further, the adjusting section 28 may adjust the reference IQ signals output from the supplying section 12, by correcting the waveform data of the waveform generating section 122 in the supplying section 12 or by adjusting the I-side DAC 124 and the Q-side DAC 126 in the supplying section 12, etc. Further, the adjusting section 28 may store errors between the reference I signal and the reference Q signal, and eliminate any influence given by errors between the reference I signal and the reference Q signal by correcting an operation result obtained by the extracting section 14 or the measurement value calculating section 16 based on the stored errors. In this case, for example, the adjusting section 28 may correct the phase angle of the demodulation signal output from the quadrature demodulating section 146 according to a phase error between the reference IQ signals, and correct the amplitude of the demodulation signal output from the quadrature demodulating section 146 according to an amplitude error between the reference IQ signals. Further, the adjusting section 28 may correct a time difference of the demodulation signal output from the quadrature demodulating section 146, according to a skew between the reference IQ signals. Furthermore, the adjusting section 28 may perform the control of switching the connections of the I-side output switching section 22, the Q-side output switching section 24, and the input switching section 26 to change between during a measurement operation and during an adjustment operation.

As described above, according to the measuring apparatus 10 of the present example, it is possible to easily and precisely calculate a carrier phase error and an amplitude error of the quadrature modulator 100. For example, with the measuring apparatus 10, it is possible to output a carrier phase error and an amplitude error of the quadrature modulator 100 which are represented by numerical values, with no need for analysis of a Lissajous waveform displayed.

Figure 2:
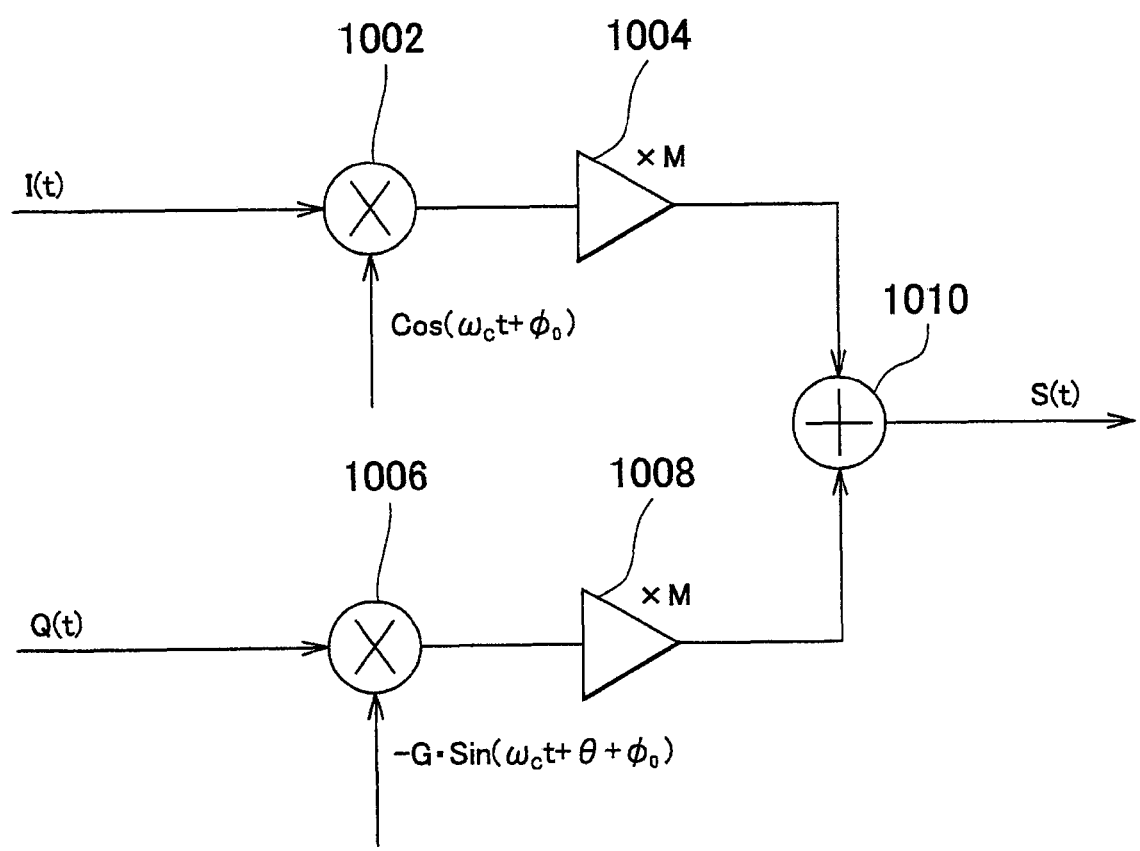
FIG. 2 shows one example of the configuration of the quadrature modulator 100.
Figure 3:
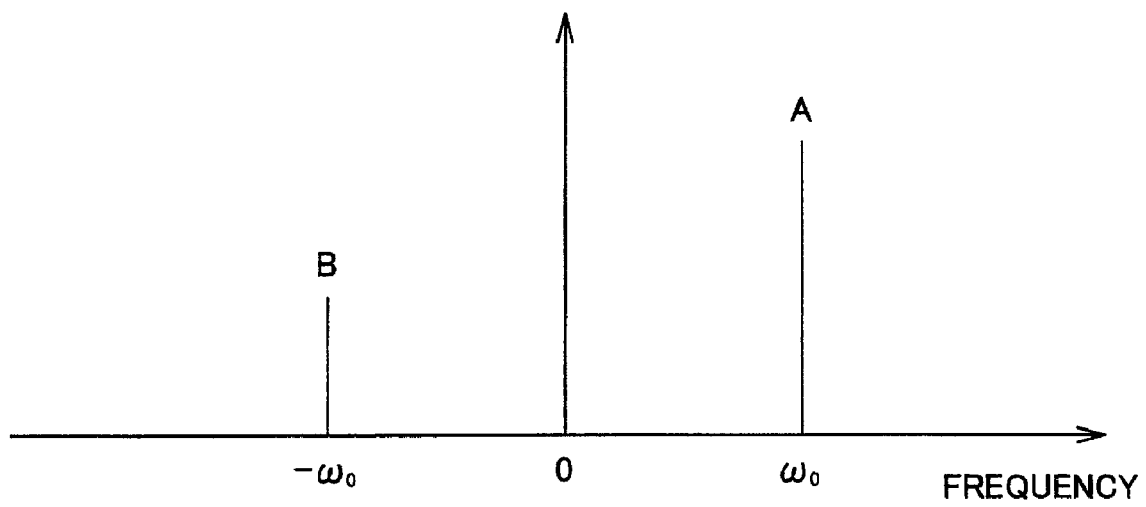
FIG. 3 shows a main signal component A and an image signal component B included in a modulation signal output from the quadrature modulator 100 as a result of applying quadrature modulation to a reference I signal and a reference Q signal.

FIG. 2 shows one example of the configuration of the quadrature modulator 100. FIG. 3 shows a main signal component A and an image signal component B, which are included in a modulation signal to be output as a result of the quadrature modulator 100 applying quadrature modulation to a reference I signal and a reference Q signal. One example of a method of the measuring apparatus 10 to calculate a carrier phase error and an amplitude error will be explained below with reference to FIG. 2 and FIG. 3.

The quadrature modulator 100 includes an in-modulator I-side multiplier 1002, an in-modulator I-side amplifier 1004, an in-modulator Q-side multiplier 1006, an in-modulator Q-side amplifier 1008, and an in-modulator adder 1010. The in-modulator I-side multiplier 1002 outputs an I-side multiplication signal obtained by multiplying an I signal (I(t)) and an I-side carrier signal (Cos(($C_t$+$\phi$)), which are input thereto.

The in-modulator I-side amplifier 1004 amplifies the I-side multiplication signal. The in-modulator Q-side multiplier 1006 outputs a Q-side multiplication signal obtained by multiplying an I signal (Q(t)) and a Q-side carrier signal (–G Sin $\omega_C$t+$\theta$+$\phi$), which are input thereto. The in-modulator I-side amplifier 1004 amplifies the Q-side multiplication signal. The in-modulator adder 1010 outputs a modulation signal S(t) obtained by adding the I-side multiplication signal output from the in-modulator I-side amplifier 1004 and the Q-side multiplication signal output from the in-modulator Q-side amplifier 1008.

Here, in a case where the angular frequency of the carrier signal is $\omega_C$, the initial phase of the carrier signal is $\phi$, the amplification factor for the I-side and Q-side multiplication signals is M, a carrier phase error is $\theta$, and an amplitude error is G, the quadrature modulator 100 outputs a modulation signal S(t) represented by the following expression (1).

[Expression 1]

$$s(t) = M \cdot \{I(t) \cdot \text{Cos}(\omega_c t + \varphi) - G \cdot Q(t) \cdot \text{Sin}(\omega_c t + \varphi + \theta)\} = \quad (1)$$
$$M \cdot \{(I(t) - Q(t) \cdot G \cdot \text{Sin}(\theta)) \cdot \text{Cos}(\omega_c t + \varphi) -$$
$$Q(t) \cdot G \cdot \text{Cos}(\theta) \cdot \text{Sin}(\omega_c t + \varphi)\}$$

Such a modulation signal S(t) is supplied from the quadrature modulator 100 to the extracting section 14 to be subjected to quadrature demodulation. The quadrature demodulating section 146 in the extracting section 14 applies quadrature demodulation to the modulation signal S(t), and outputs a baseband signal represented by the following expression (2).

[Expression 2]

$$\frac{M \cdot e^{j\phi}}{2} \cdot \{(I(t) - Q(t) \cdot G \cdot \text{Sin}\theta)) + j \cdot Q(t) \cdot G \cdot \text{Cos}(\theta)\} = \quad (2)$$
$$\frac{M \cdot e^{j\phi}}{2} \cdot \{I(t) + j \cdot Q(t) \cdot G \cdot (\text{Cos}(\theta) + j \cdot \text{Sin}(\theta))\} =$$
$$\frac{M \cdot e^{j\phi}}{2} \cdot \{I(t) + j \cdot Q(t) \cdot G \cdot e^{j\theta}\}$$

Further, in a case where the supplying section 12 supplies the quadrature modulator 100 with a reference I signal {I(t)=Cos($\omega_0$t)} and a reference Q signal {Q(t)=Sin($\omega_0$t)}, which are sine waves, the quadrature demodulating section 146 outputs a baseband signal represented by the following expression (3).

[Expression 3]

$$\frac{M \cdot e^{j\phi}}{2} \cdot \{I(t) + j \cdot Q(t) \cdot G \cdot e^{j\theta}\} = \quad (3)$$
$$\frac{M \cdot e^{j\phi}}{2} \cdot \left\{ \frac{e^{j\omega_0 t} + e^{-j\omega_0 t}}{2} + j \cdot \frac{e^{j\omega_0 t} - e^{-j\omega_0 t}}{2j} \cdot G \cdot e^{j\theta} \right\} =$$
$$\frac{M \cdot e^{j\phi}}{2} \cdot \left\{ \frac{(1 + G \cdot e^{j\theta})e^{j\omega_0 t}}{2} + \frac{(1 - G \cdot e^{j\theta})e^{-j\omega_0 t}}{2} \right\} =$$
$$\frac{M \cdot e^{j\phi}}{4} \cdot \{(1 + G \cdot e^{j\theta})e^{j\omega_0 t} + (1 - G \cdot e^{j\theta})e^{-j\omega_0 t}\}$$

The dividing section 148 extracts, from the baseband signal output from the quadrature demodulating section 146, a main signal component A in the modulation signal that is the result of modulating the reference IQ signals (i.e., a frequency component included in the baseband signal that has the angular frequency $\omega_0$). Further, the dividing section 148 extracts, from the baseband signal output from the quadrature demodulating section 146, an image signal component B in the modulation signal that occurs at a position symmetric to the modulated reference IQ signals with respect to the carrier signal (i.e., a frequency component included in the baseband signal that has an angular frequency $-\omega_0$). That is, the dividing section 148 extracts a main signal component A and an image signal component B which are represented by the following expression (4-1) and expression (4-2), respectively. Note that in a case where there is no carrier phase error or amplitude error ($\theta=0$, $G=1$), the image signal component B is 0.

[Expression 4]

$$\begin{cases} A = \dfrac{M \cdot e^{j\phi}}{4} \cdot (1 + G \cdot e^{j\theta}) & \text{(4-1)} \\ B = \dfrac{M \cdot e^{j\phi}}{4} \cdot (1 - G \cdot e^{j\theta}) & \text{(4-2)} \end{cases}$$

Then, the error measuring section 30 calculates the carrier phase error $\theta$ and the amplitude error G, based on the main signal component A and the image signal component B which are represented by the expressions (4-1) and (4-2). First, the error measuring section 30 calculates a correcting value C which is not dependent on the carrier phase error $\theta$ or the amplitude error G, based on the sum of the main signal component A and the image signal component B. For example, the error measuring section 30 calculates a correcting value C, which is represented by the following expression (5).

[Expression 5]

$$A + B = \frac{2 \cdot M \cdot e^{j\phi}}{4} \equiv 2 \cdot C \tag{5}$$

Then, the error measuring section 30 calculates a main component divisional value A' obtained by dividing the main signal component A by the correcting value C, and an image component divisional value B' obtained by dividing the image signal component B by the correcting value C, which are represented by the following expressions (6).

[Expressions 6]

$$\begin{cases} A' = A/C = 1 + G \cdot e^{j\theta} \\ B' = B/C = 1 - G \cdot e^{j\theta} \end{cases} \tag{6}$$

Here, the main component divisional value A' can be represented as the following expression (7). Further, an expression (8) can be derived from the following expression (7).

[Expression 7]

$$A' = 1 + G \cdot (\text{Cos}(\theta) + j\text{Sin}(\theta))(1 + G \cdot \text{Cos}(\theta)) + jG \cdot \text{Sin}(\theta) = \text{Re} + j\,\text{Im} \tag{7}$$

[Expression 8]

$$\frac{\text{Im}}{\text{Re}-1} = \frac{G \cdot \text{Sin}(\theta)}{G \cdot \text{Cos}(\theta)} = \text{Tan}(\theta) \tag{8}$$

Accordingly, the error measuring section 30 can calculate a carrier phase error $\theta$, which is represented as the following expression (9), from the expression (7) and the expression (8). Further, the error measuring section 30 can calculate an amplitude error G, which is represented as the following expression (10), from the expression (7), the expression (8), and the expression (9).

[Expression 9]

$$\theta = \text{Tan}^{-1}\left(\frac{\text{Im}}{\text{Re}-1}\right) \tag{9}$$

[Expression 10]

$$G = \frac{\text{Re}-1}{\text{Cos}(\theta)} \tag{10}$$

That is, the error measuring section 30 can calculate the carrier phase error $\theta$ by computing the arctangent of a value obtained by dividing the imaginary number component Im of the main component divisional value A' by a value (Re$-1$) obtained by subtracting 1 from the real number component Re of the main component divisional value A' (expression (9)). Further, the error measuring section 30 can calculate the amplitude error G by dividing a value (Re$-1$) obtained by subtracting 1 from the real number component Re of the main component divisional value A' by the cosine (Cos($\theta$)) of the carrier phase error $\theta$ (expression (10)). Instead of this, the error measuring section 30 may calculate the amplitude error G (=Im/Sin($\theta$)) by dividing the imaginary number component Im of the main component divisional value A' by the sine (Sin($\theta$)) of the carrier phase error $\theta$.

Further, the error measuring section 30 may calculate the carrier phase error $\theta$ by computing the arctangent of a value obtained by dividing the imaginary number component Im of the image component divisional value B' by a value (Re$-1$) obtained by subtracting 1 from the real number component Re of the image component divisional value B'. Further, the error measuring section 30 may calculate the amplitude error G by dividing a value (Re$-1$) obtained by subtracting 1 from the real number component Re of the image component divisional value B' by the cosine (Cos($\theta$)) of the carrier phase error $\theta$, and inverting the positive or negative characteristic of the obtained divisional value. Furthermore, the error measuring section 30 may calculate the amplitude error G by dividing the imaginary number component Im of the image component divisional value B' by the sine (Sin($\theta$)) of the carrier phase error $\theta$, and judging whether the obtained divisional value is positive or negative.

Further, the error measuring section 30 calculates a value ($G \cdot e^{j\theta}$) obtained by subtracting 1 from the main component divisional value A', or a value ($G \cdot e^{j\theta}$) obtained by inverting the positive or negative characteristic of a value obtained by subtracting 1 from the image component divisional value B'. Then, the error measuring section 30 may calculate the amplitude error G by computing the absolute value of the obtained value ($G \cdot e^{j\theta}$), and may calculate the carrier phase error $\theta$ by computing the phase of the obtained value ($G \cdot e^{j\theta}$).

As described above, the error measuring section 30 can calculate the carrier phase error and amplitude error of the quadrature modulator 100 by computer operations, based on the main signal component A and the image signal component B. Hence, the measuring apparatus 10 according to the present example can easily calculate the carrier phase error and the amplitude error of the quadrature modulator 100.

FIG. 4 shows one example of the configuration of the error measuring section 30 according to the present embodiment. The error measuring section 30, which performs the above-described operations, may include, for example, a correcting value calculating section 32, a correcting value dividing section 34, and an error calculating section 36. The correcting value calculating section 32 adds the main signal component A and the image signal component B to calculate a correcting value C that is not dependent on the carrier phase error θ or the amplitude error G. For example, the correcting value calculating section 32 may calculate a correcting value C by performing the operation of the expression (5).

The correcting value dividing section 34 calculates divisional values A' and B', which are obtained by dividing at least one of the main signal component A and the image signal component B by the correcting value C. For example, the correcting value dividing section 34 may calculate the divisional values A' and B' by performing the operation of the expressions (6).

The error calculating section 36 calculates at least one of the carrier phase error θ and the amplitude error G based on the divisional values A' and B'. For example, the error calculating section 36 may include a carrier phase error calculating section 38 and an amplitude error calculating section 40. The carrier phase error calculating section 38 may, for example, calculate the carrier phase error θ by performing the operation of the expression (9). The amplitude error calculating section 40 may, for example, calculate the amplitude error G by performing the operation of the expression (10). The error measuring section 30 having this configuration can easily calculate the carrier phase error θ and the amplitude error G of the quadrature modulator 100.

Figure 5:
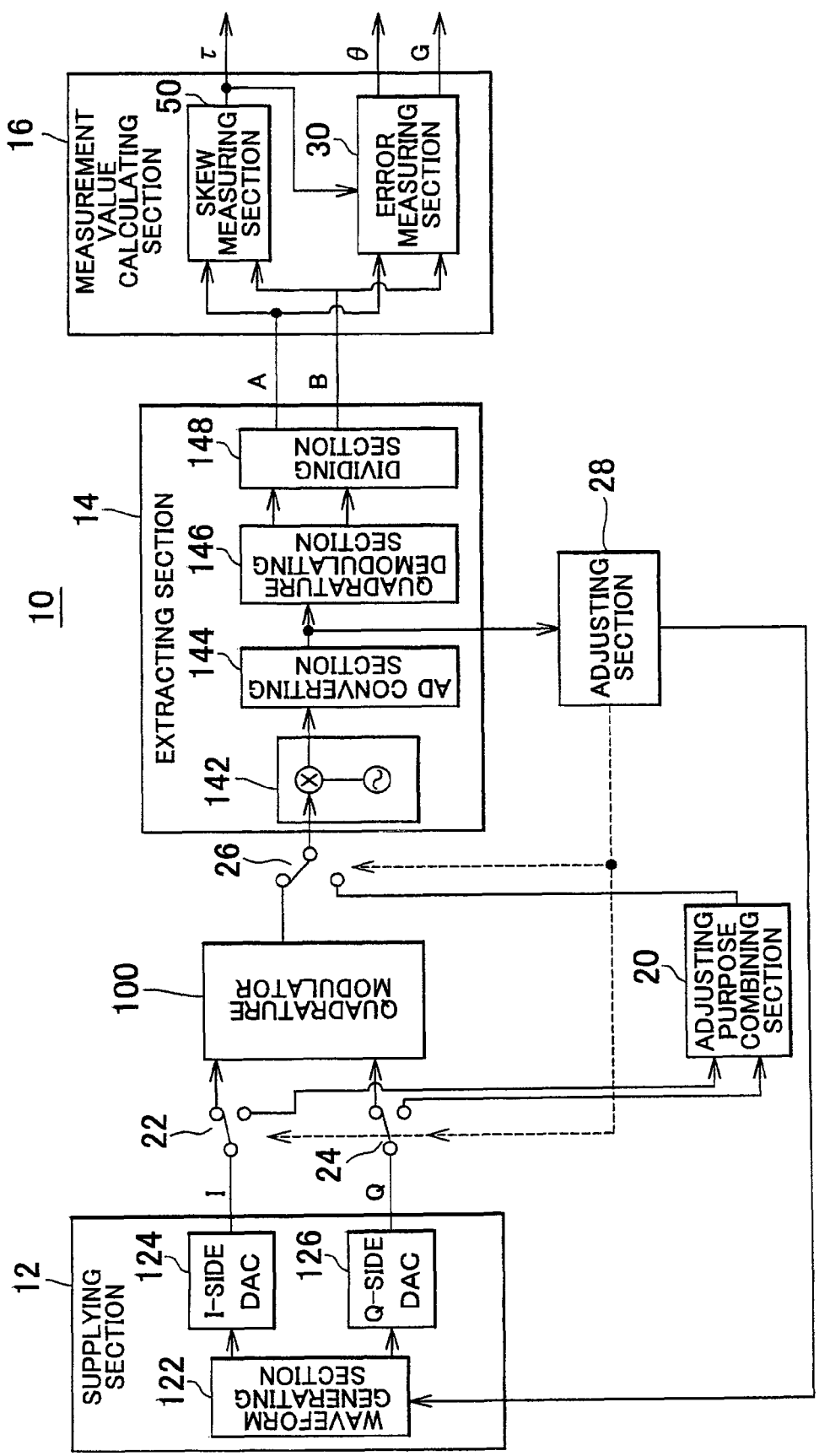
FIG. 5 shows the configuration of the measuring apparatus 10 according to a first modification of the embodiment of the present invention, together with the quadrature modulator 100.
Figure 6:
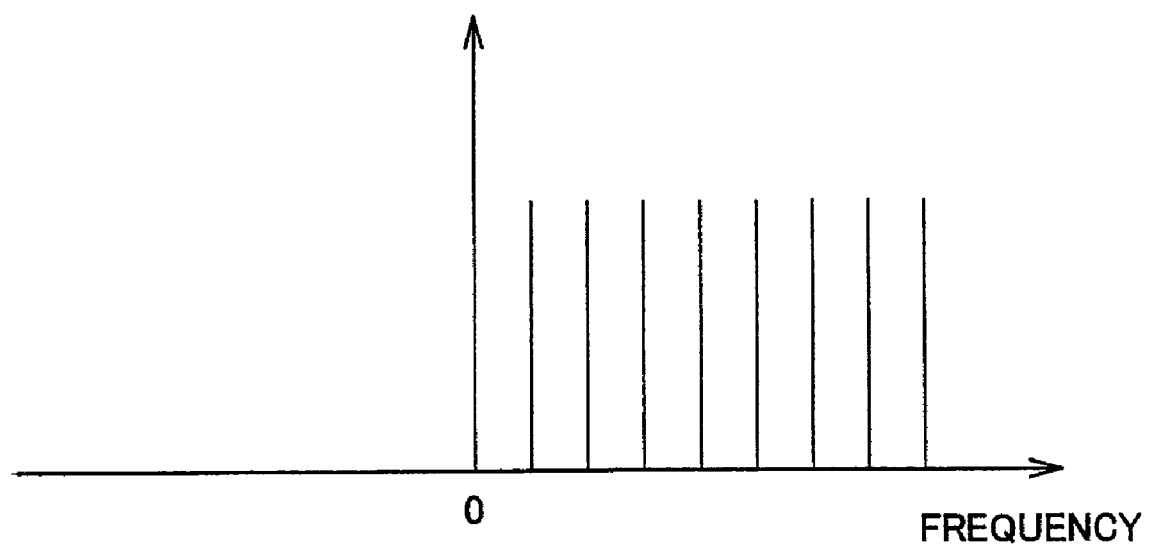
FIG. 6 shows one example of a frequency characteristic of a plurality of reference I signals having different frequencies from each other and a plurality of reference Q signals having different frequencies from each other.

FIG. 5 shows the configuration of the measuring apparatus 10 according to a first modification of the present embodiment, together with the quadrature modulator 100. FIG. 6 shows one example of the frequency characteristics of a plurality of reference I signals having different frequencies from each other and a plurality of reference Q signals having different frequencies from each other. FIG. 7 shows one example of the frequency characteristics of a plurality of reference I signals and reference Q signals distributed in frequency ranges which are positive or negative with respect to a carrier signal. Since configurations and functions of the measuring apparatus 10 according to the present modification that are given the same reference numerals as shown in FIG. 1 are generally the same as the members shown in FIG. 1 denoted by those reference numerals, explanation thereof will be omitted below, except explanation for any differences.

The measuring apparatus 10 according to the present modification measures a skew between an I signal and a Q signal, in addition to a carrier phase error and an amplitude error. The supplying section 12 according to the present modification supplies the quadrature modulator 100 with a plurality of reference I signals having different frequencies from each other, and a plurality of reference Q signals whose phase is shifted by 90 degrees from the plurality of reference I signals respectively, as shown in FIG. 6. That is, when a skew is to be measured, the supplying section 12 supplies multi-tone signals to the quadrature modulator 100. For example, the supplying section 12 may output multi-tone signals represented by the following expression (11). Note that in this case, the supplying section 12 may output multi-tone signals of the respective reference IQ signals, whose initial phase φ is changed, in order to reduce the crest factor.

[Expression 11]

$$\sum_{k=1}^{N} \text{Cos}[\omega_k t + \phi_k] + j\text{Sin}[\omega_k t + \phi_k] \quad (11)$$

Further, the supplying section 12 may supply the quadrature modulator 100 with a plurality of reference IQ signals which are all distributed in either a frequency range on the positive side of a carrier signal or a frequency range on the negative side of the carrier signal, as shown in FIG. 6. Instead of this, the supplying section 12 may supply the quadrature modulator 100 with a plurality of reference IQ signals (reference I signals and reference Q signals) which are distributed in the frequency ranges on the positive and negative sides of the carrier signal as shown in FIG. 7, and which have such frequencies as not to allow each of these signals after modulated to overlap the main signal and image signal of the others of these signals after modulated. Hence, the supplying section 12 can enable calculation of more appropriate carrier phase error, amplitude error, and skew, by outputting more reference IQ signals.

The extracting section 14 extracts a plurality of main signal components A which are the result of modulating the plurality of reference I signals and the plurality of reference Q signals, and a plurality of image signal components B which occur at positions symmetric to the plurality of modulated reference I signals and the plurality of modulated reference Q signals with respect to the carrier signal, from a modulation signal output from the quadrature modulator 100 as a result of applying quadrature modulation to the reference IQ signals (reference I signals and reference Q signals). For example, the extracting section 14 may generate a base band signal as represented by the following expressions (12) by applying quadrature demodulation to the modulation signal. For example, the extracting section 14 may output the plurality of main signal components A and the plurality of image signal components B, which have been modulated on the base band signal, by dividing them according to the respective frequencies. Further, in a case where the initial phase φ of the respective reference IQ signals have been changed by the supplying section 12, the extracting section 14 may make the phase of the plurality of main signal components A and the phase of the plurality of image signal components B coincide at the time of the quadrature demodulation.

[Expressions 12]

$$A(\omega) = \text{MAIN SIGNAL COMPONENT}\left\{\sum_{k=1}^{N} R(\omega)e^{-j\phi k}\right\} \quad (12)$$

$$B(\omega) = \text{IMAGE SIGNAL COMPONENT}\left\{\sum_{k=1}^{N} R(\omega)e^{-j\phi k}\right\}$$

The measurement value calculating section 16 of the measuring apparatus 10 further includes a skew measuring section 50. The skew measuring section 50 receives the main signal components A and the image signal components B output from the extracting section 14. Then, the skew measuring section 50 calculates a skew in the quadrature modulator 100, based on the main signal components A and the image signal components B. For example, the skew measuring section 50 may calculate the skew based on a main signal differential component obtained by differentiating the plurality of main signal components A with respect to frequency, and an image signal differential component obtained by differentiating the plurality of image signal components B with respect to frequency.

As described above, the measuring apparatus 10 according to the present example can easily and precisely calculate a carrier phase error, an amplitude error, and a skew of the quadrature modulator 100. For example, the measuring apparatus 10 can calculate a carrier phase error, an amplitude error, and a skew of the quadrature modulator 100 which are represented as numerical values, without analyzing any Lissajous waveform displayed.

Figure 8:
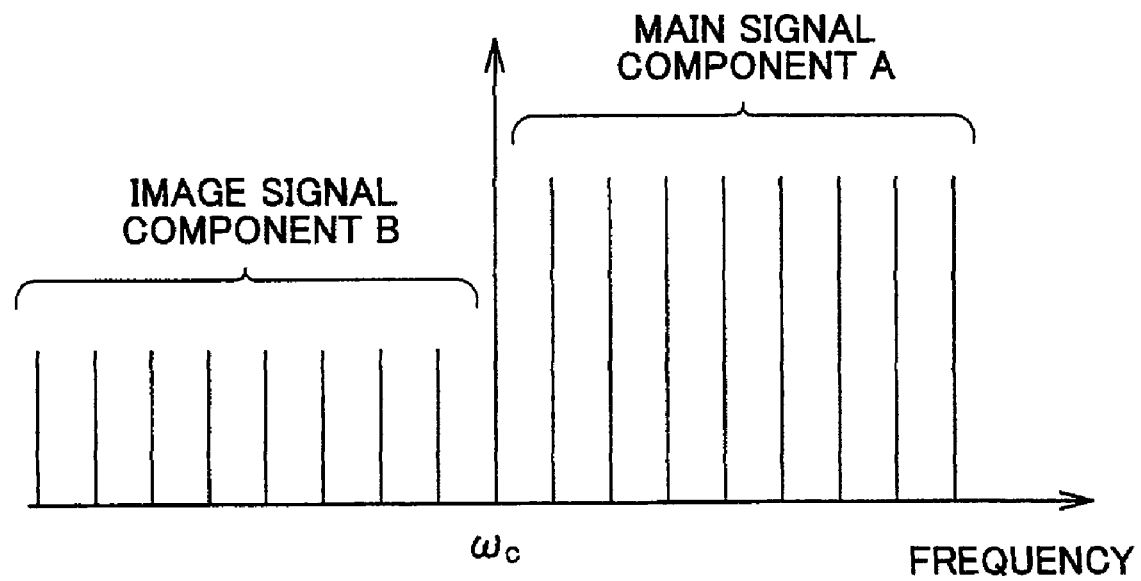
FIG. 8 shows one example of a frequency characteristic of a modulation signal to be output from the quadrature modulator 100 as a result of modulating the signals shown in FIG. 6, in a case where the quadrature modulator 100 has a carrier phase error and an amplitude error.
Figure 9:
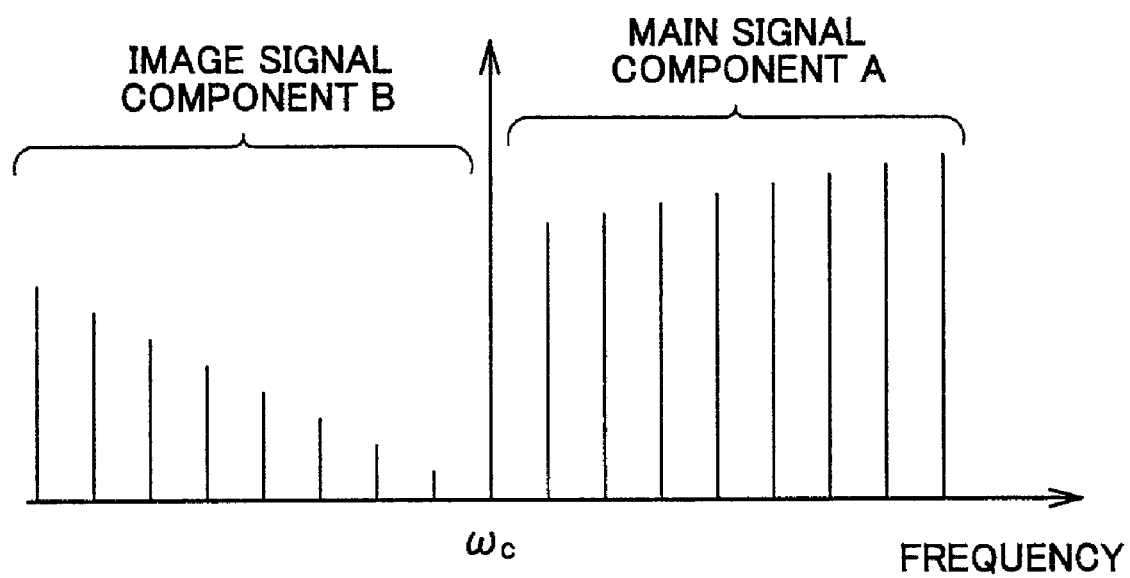
FIG. 9 shows one example of a frequency characteristic of a modulation signal to be output from the quadrature modulator 100 as a result of modulating the signals shown in FIG. 6, in a case where the quadrature modulator 100 has a skew.

FIG. 8 shows one example of the frequency characteristic of a modulation signal to be output from the quadrature modulator 100 as a result of modulating the signals shown in FIG. 6, in a case where the quadrature modulator 100 has a carrier phase error and an amplitude error. FIG. 9 shows one example of the frequency characteristic of a modulation signal to be output from the quadrature modulator 100 as a result of modulating the signals shown in FIG. 6, in a case where the quadrature modulator 100 has a skew.

In a case where the quadrature modulator 100 has no skew, the respective main signal components A having their own frequencies have generally the same amplitude and phase and the respective image signal components B having their own frequencies have generally the same amplitude and phase, as shown in FIG. 8. As compared with this, in a case where the quadrature modulator 100 has any skew, the respective main signal components A having their own frequencies have their phases vary generally proportionally to the frequency as shown in FIG. 9, and so do the image signal components B. That is, in a case where the quadrature modulator 100 has a skew, the main signal components A and image signal components B have larger (or smaller) phases, which are proportional to the absolute value of the frequency. Further, the amounts of variation in the phases of the main signal components A and image signal components B take values corresponding to the skew in the quadrature modulator 100.

Figure 10:
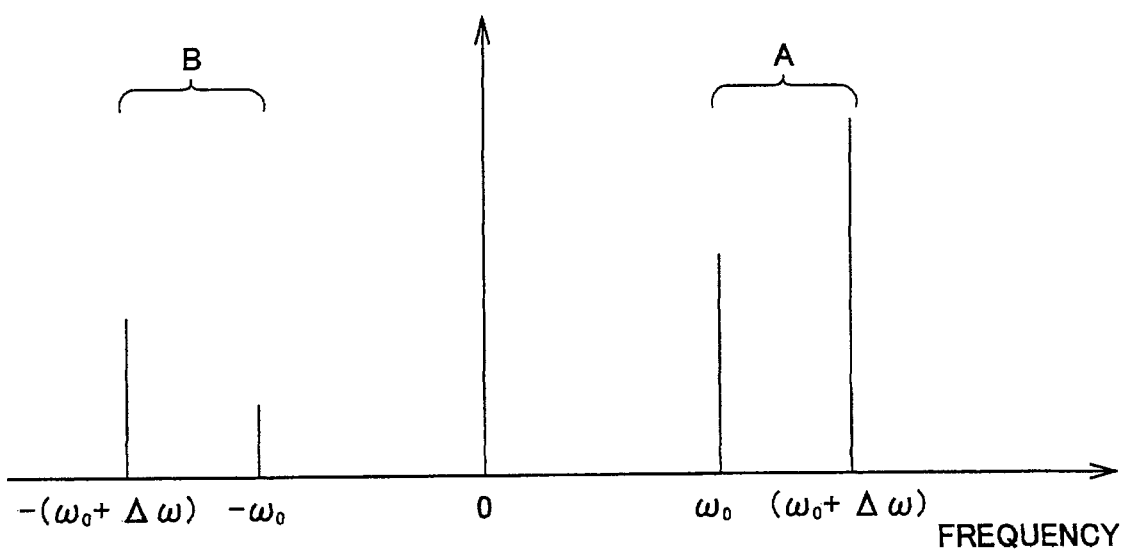
FIG. 10 shows main signal components A and image signal components B included in a modulation signal to be output from the quadrature modulator 100 as a result of applying quadrature modulation to a plurality of reference I signals and a plurality of reference Q signals having a plurality of frequencies, in a case where the quadrature modulator 100 has a skew.

FIG. 10 shows main signal components A and image signal components B included in a modulation signal to be output from the quadrature modulator 100 as a result of applying quadrature modulation to a plurality of reference I signals and a plurality of reference Q signals having a plurality of frequencies, in a case where the quadrature modulator 100 has a skew. With reference to FIG. 10, one example of a method of the measuring apparatus 10 to calculate a carrier phase error, an amplitude error, and a skew will be explained.

A modulation signal to be output from the quadrature modulator 100 having a skew τ and a signal to be output from the quadrature modulator 100 in a case where an I signal and a Q signal input to the quadrature modulator 100 have a skew τ are the same. That is, a baseband signal obtained as a result of supplying a reference I signal (I(t)=Cos($\omega_0$t)) and reference Q signal (Q(t)=Sin($\omega_0$t)) to the quadrature modulator 100 having a skew τ and a baseband signal obtained as a result of supplying a reference I signal (I(t)=Cos($\omega_0$t)) and reference Q signal (Q(t)=Sin($\omega_0$(t−τ))) having a skew τ to the quadrature modulator 100 having no skew are the same.

That is, in a case where the quadrature modulator 100 has a skew τ, a baseband signal will be a signal obtained by substituting I(t)=Cos($\omega_0$t) and Q(t)=Sin($\omega_0$(t−τ)) for I(t) and Q(t) in the expression (2). Hence, the quadrature demodulating section 146 will output a baseband signal represented by the following expression (13).

[Expression 13]

$$\frac{M \cdot e^{j\phi}}{2} \cdot \{I(t) + j \cdot Q(t) \cdot G \cdot e^{j\theta}\} = \quad (13)$$

$$\frac{M \cdot e^{j\phi}}{2} \cdot \left\{ \frac{e^{j\omega_0 t} + e^{-j\omega_0 t}}{2} + j \cdot \frac{e^{j\omega_0(t-\tau)} - e^{-j\omega_0(t-\tau)}}{2j} \cdot G \cdot e^{j\theta} \right\} =$$

$$\frac{M \cdot e^{j\phi}}{2} \cdot \left\{ \frac{\left(1 + G \cdot e^{j\theta} \cdot e^{-j\omega_0\tau}\right) e^{j\omega_0 t}}{2} + \frac{(1 - G \cdot e^{j\theta} \cdot e^{j\omega_0\tau}) e^{-j\omega_0 t}}{2} \right\} =$$

$$\frac{M \cdot e^{j\phi}}{4} \cdot \left\{ \left(1 + G \cdot e^{j\theta} \cdot e^{-j\omega_0\tau}\right) e^{j\omega_0 t} + (1 - G \cdot e^{j\theta} \cdot e^{-j\omega_0\tau}) e^{-j\omega_0 t} \right\}$$

The dividing section 148 extracts main signal components A represented by the following expression (14-1) from the baseband signal output from the quadrature demodulating section 146. The dividing section 148 further extracts image signal components B represented by the following expression (14-2) from the baseband signals output from the quadrature demodulating section 146.

[Expressions 14]

$$\begin{cases} A = \frac{M \cdot e^{j\phi}}{4} \cdot (1 + G \cdot e^{j\theta} \cdot e^{-j\omega_0\tau}) & (14-1) \\ B = \frac{M \cdot e^{j\phi}}{4} \cdot (1 - G \cdot e^{j\theta} \cdot e^{j\omega_0\tau}) & (14-2) \end{cases}$$

The skew measuring section 50 calculates the skew τ based on the main signal components A and the image signal components B represented by the expressions (14). First, the skew measuring section 50 calculates a differential value by differentiating the main signal components A with respect to frequency. For example, the skew measuring section 50 may calculate, as the differential value, a difference represented by the following expression (15-1) between a main signal component A having an angular frequency $\omega_0$ and a main signal component A having an angular frequency ($\omega_0\Delta\omega$). Further, the skew measuring section 50 calculates a differential value obtained by differentiating the image signal components B with respect to frequency. For example, the skew measuring section 50 may calculate, as the differential value, a difference represented by the following expression (15-2) between an image signal component B having an angular frequency −$\omega_0$ and an image signal component B having an angular frequency −($\omega_0+\Delta\omega$).

[Expressions 15]

$$A(\omega_0 + \Delta\omega) - A(\omega_0) = \frac{M \cdot e^{j\phi} \cdot G \cdot e^{j\theta}}{4} \cdot \left( \begin{array}{c} e^{-j(\omega_0+\Delta\omega)\tau} - \\ e^{-j\omega_0\tau} \end{array} \right) \quad (15-1)$$

$$B(-(\omega_0 + \Delta\omega)) - B(-\omega_0) = \frac{M \cdot e^{j\phi} \cdot G \cdot e^{j\theta}}{4} \cdot \left( \begin{array}{c} -e^{j(\omega_0+\Delta\omega)\tau} + \\ e^{j\omega_0\tau} \end{array} \right) \quad (15-2)$$

Here, in a case where the expression (15-1) is 0, τ is 0. In a case where the expression (15-1) is not 0, the skew measuring section 50 calculates a differential divisional value obtained by dividing the differential value obtained by differentiating the image signal components B with respect to frequency by the differential value obtained by differentiating the main signal components A with respect to frequency. For example, the skew measuring section 50 may calculate an expression (15-2)/(15-1) represented by the following expression (16) as the differential divisional value.

[Expression 16]

$$\frac{B(\omega_0 + \Delta\omega) - B(\omega_0)}{A(\omega_0 + \Delta\omega) - A(\omega_0)} = \frac{-e^{j(\omega_0+\Delta\omega)\tau} + e^{j\omega_0\tau}}{e^{-j(\omega_0+\Delta\omega)\tau} - e^{-j\omega_0\tau}} = \frac{-e^{j\omega_0\tau}(e^{j\Delta\omega\tau} - 1)}{e^{-j\omega_0\tau}(e^{-j\Delta\omega\tau} - 1)} = \frac{-e^{j\omega_0\tau}e^{j\Delta\omega\tau/2}(e^{j\Delta\omega\tau/2} - e^{-j\Delta\omega\tau/2})}{e^{-j\omega_0\tau}e^{-j\Delta\omega\tau/2}(e^{-j\Delta\omega\tau/2} - e^{j\Delta\omega\tau/2})} = \frac{e^{j\omega_0\tau}e^{j\Delta\omega\tau/2}}{e^{-j\omega_0\tau}e^{-j\Delta\omega\tau/2}} = e^{j(2\omega_0+\Delta\omega)\tau} = e^{j(\omega_0+\omega_1)\tau} \; (\because \omega_1 = \omega_0 + \Delta\omega) \quad (16)$$

Then, the skew measuring section 50 calculates the phase of the differential divisional value, and calculates the skew τ, which is obtained by converting the calculated phase into the time domain. For example, the skew measuring section 50 may calculate the phase by computing the arctangent of the differential divisional value obtained by the expression (16), and multiply the computed phase by angular frequencies to calculate a skew τ in the time domain, as represented by the following expression (17).

As described above, the skew measuring section 50 can calculate a skew of the quadrature modulator 100 by computer operations, based on the main signal components A and the image signal components B. Hence, the measuring apparatus 10 according to the present example can easily calculate a skew of the quadrature modulator 100.

[Expression 17]

$$\tau = \frac{1}{\omega_0 + \omega_1} \operatorname{Tan}^{-1}(e^{j(\omega_0+\omega_1)\tau}) \quad (17)$$

Next, the error measuring section 30 calculates a carrier phase error θ and an amplitude error G based on the skew τ obtained as above and the main signal components A and image signal components B represented by the expressions (14). First, the error measuring section 30 causes a lead (or a lag) of the phase of each of the main signal components A and image signal components B by an angle corresponding to the calculated skew τ, to obtain adjusted main signal components A" and adjusted image signal components B", which are the main signal components A and image signal components B as adjusted. For example, the error measuring section 30 may calculate adjusted main signal components A" and adjusted image signal components B" as represented by the following expressions (18).

[Expressions 18]

$$\begin{cases} A'' = A \cdot e^{j\omega_0\tau} = \frac{M \cdot e^{j\phi}}{4} \cdot (e^{j\omega_0\tau} + G \cdot e^{j\theta}) \\ B'' = B \cdot e^{-j\omega_0\tau} = \frac{M \cdot e^{j\phi}}{4} \cdot (e^{-j\omega_0\tau} - G \cdot e^{j\theta}) \end{cases} \quad (18)$$

Then, the error measuring section 30 calculates a correcting value C that is not dependent on the carrier phase error (or the amplitude error Q based on a value obtained by adding the adjusted main signal components A" and the adjusted image signal components B". For example, the error measuring section 30 may calculate a correcting value C represented by the following expression (19).

[Expression 19]

$$C = A'' + B'' = \frac{M \cdot e^{j\phi}}{4} \cdot (e^{j\omega_0\tau} + e^{-j\omega_0\tau}) = \frac{M \cdot e^{j\phi}}{4} \cdot 2 \cdot \operatorname{Cos}(\omega_0\tau) \frac{M \cdot e^{j\phi}}{4} = \frac{A \cdot e^{j\omega_0\tau} + B \cdot e^{-j\omega_0\tau}}{2 \cdot \operatorname{Cos}(\omega_0\tau)} \equiv \frac{C}{2 \cdot \operatorname{Cos}(\omega_0\tau)} \quad (19)$$

Then, the error measuring section 30 calculates main component divisional values A' obtained by dividing the main signal components A by the correcting value C and image component divisional values B' obtained by dividing the image signal components B by the correcting value C, as represented by the following expressions (20-1) and (20-2).

[Expressions 20]

$$\begin{cases} A' = \frac{A}{C} = \frac{(1 + G \cdot e^{j\theta} \cdot e^{-j\omega_0\tau})}{2 \cdot \operatorname{Cos}(\omega_0\tau)} & (20-1) \\ B' = \frac{B}{C} = \frac{(1 - G \cdot e^{j\theta} \cdot e^{j\omega_0\tau})}{2 \cdot \operatorname{Cos}(\omega_0\tau)} & (20-2) \end{cases}$$

Then, the error measuring section 30 calculates a value ($G \cdot e^{j\theta}$) obtained by subtracting the main component divisional values A' and the image component divisional values B' as represented by the following expression (21). Then, the error measuring section 30 calculates the amplitude error G by computing the absolute value of the value ($G \cdot e^{j\theta}$), and calculates the carrier phase error θ by computing the phase of the value ($G \cdot e^{j\theta}$).

[Expression 21]

$$A' - B' = \frac{A - B}{C} = \frac{G \cdot e^{j\theta} \cdot (e^{-j\omega_0\tau} + e^{j\omega_0\tau})}{2 \cdot \operatorname{Cos}(\omega_0\tau)} = G \cdot e^{j\theta} \quad (21)$$

As described above, the error measuring section 30 can calculate the carrier phase error and the amplitude error of the quadrature modulator 100 by computer operations, based on the skew τ, and the main signal components A and image signal components B. Hence, the measuring apparatus 10 according to the present example can easily calculate the carrier phase error and the amplitude error of the quadrature modulator 100.

Figure 11:
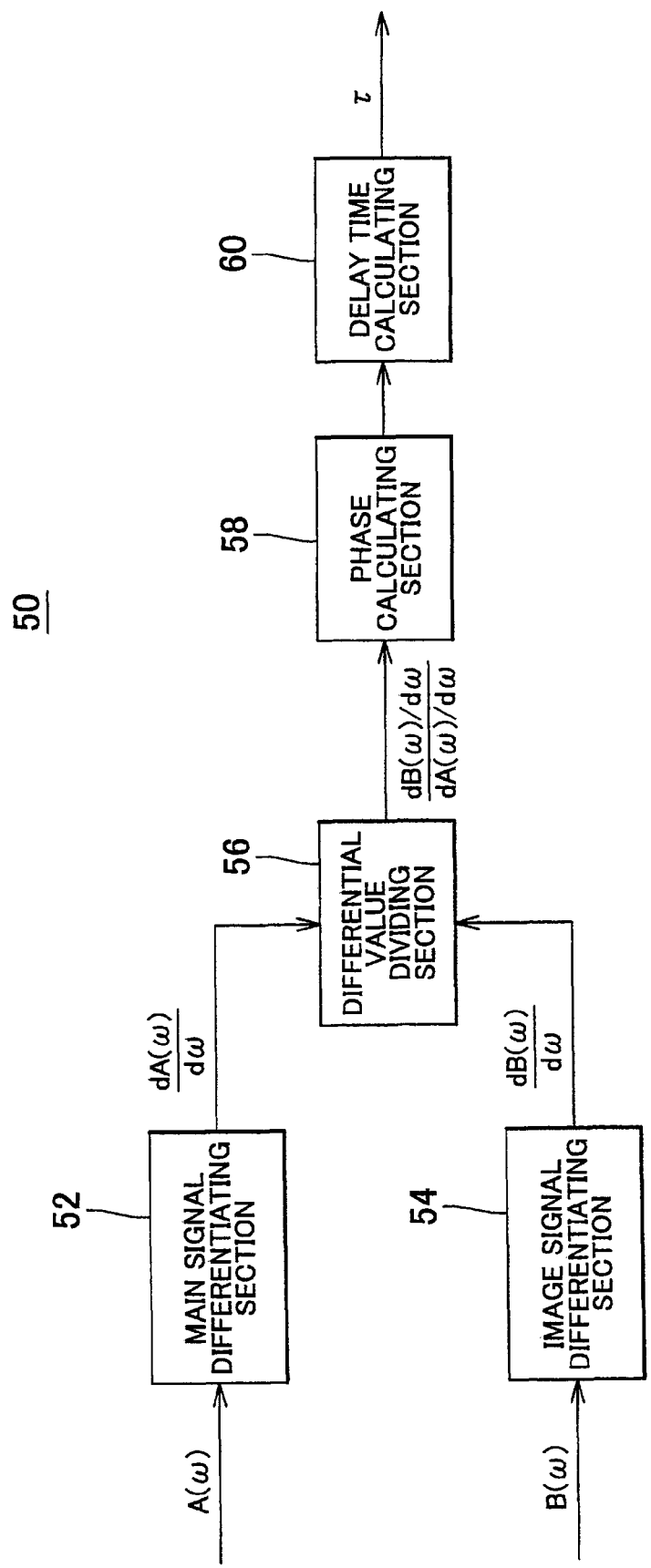
FIG. 11 shows one example of the configuration of a skew measuring section 50 according to the first modification.

FIG. 11 shows one example of the configuration of the skew measuring section 50 according to the first modification. The skew measuring section 50, which performs the calculation of a skew τ described above, may, for example, include a main signal differentiating section 52, an image signal differentiating section 54, a differential value dividing section 56, a phase calculating section 58, and a delay time calculating section 60.

The main signal differentiating section 52 calculates a main signal differential component obtained by differentiating a plurality of main signal components A with respect to frequency. For example, the main signal differentiating section 52 may calculate a main signal differential component by performing the operation of the expression (15-1). The image signal differentiating section 54 calculates an image signal differential component obtained by differentiating a plurality of image signal components B with respect to frequency. For example, the main signal differentiating section 52 may calculate an image signal differential component by performing the operation of the expression (15-2).

The differential value dividing section 56 calculates a differential divisional value obtained by dividing the image signal differential component by the main signal differential component. For example, the differential value dividing section 56 may calculate a differential divisional value by performing the operation of the expression (16).

The phase calculating section 58 calculates a phase value by computing the arctangent of the differential divisional value calculated by the differential value dividing section 56. The delay time calculating section 60 multiplies the phase calculated by the phase calculating section 58 by angular frequencies, thereby to output a skew $\tau$, which has been converted to be in the time domain. For example, the phase calculating section 58 and the delay time calculating section 60 may calculate the skew $\tau$ by performing the operation of the expression (17). The skew measuring section 50 performing these operations can easily and precisely calculate the skew of the quadrature modulator 100.

Figure 12:
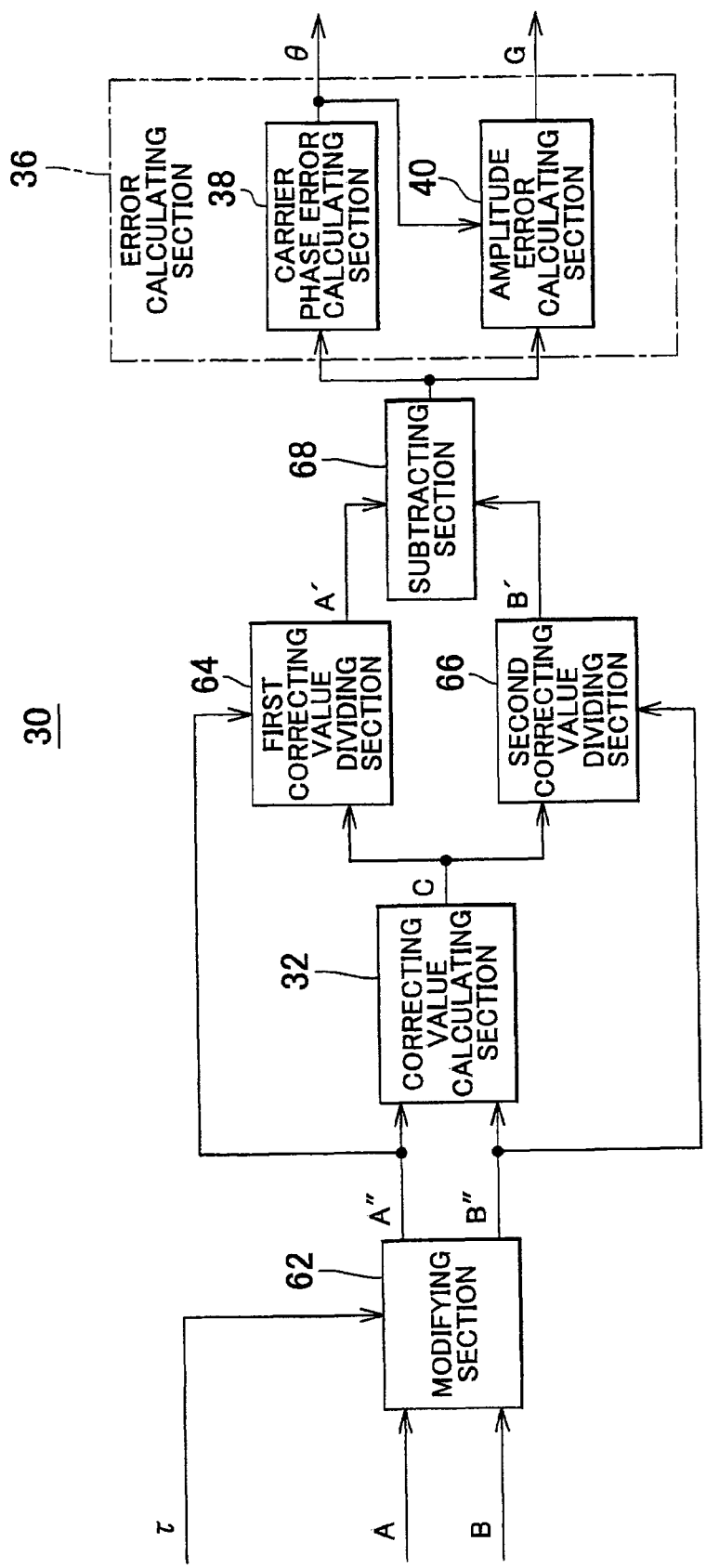
FIG. 12 shows one example of the configuration of the error measuring section 30 according to the first modification.

FIG. 12 shows one example of the configuration of the error measuring section 30 according to the first modification. For example, the error measuring section 30, which performs the calculation of the carrier phase error $\theta$ and the amplitude error G as described above, may include a modifying section 62, a correcting value calculating section 32, a first correcting value dividing section 64, a second correcting value dividing section 66, a subtracting section 68, and an error calculating section 36.

The modifying section 62 causes a lead or a lag of the phase of each of the main signal components A and image signal components B by an angle corresponding to the calculated skew $\tau$, thereby to output adjusted main signal components A" and adjusted image signal components B", which are the main signal components A and corresponding image signal components B respectively adjusted according to the skew $\tau$. For example, the modifying section 62 may calculate adjusted main signal components A" and adjusted image signal components B" by performing the operation of the expressions (18).

The correcting value calculating section 32 calculates a correcting value C that is not dependent on the carrier phase error $\theta$ or the amplitude error G, by adding the adjusted main signal components A" and the adjusted image signal components B". For example, the correcting value calculating section 32 may calculate a correcting value C by performing the operation of the expression (19).

The first correcting value dividing section 64 calculates main component divisional values A' obtained by dividing the main signal components A by the correcting value C. For example, the first correcting value dividing section 64 may calculate main component divisional values A' by performing the operation of the expression (20-1). The second correcting value dividing section 66 calculates image component divisional values B' obtained by dividing the image signal components B by the correcting value C. For example, the first correcting value dividing section 64 may calculate main component divisional values B' by performing the operation of the expression (20-2). The subtracting section 68 calculates a subtractive value obtained by subtracting the main component divisional values A' and the image component divisional values B'. For example, the subtracting section 68 may calculate a subtractive value by performing the operation of the expression (21).

The error calculating section 36 calculates at least one of the carrier phase error $\theta$ and the amplitude error G based on the subtractive value. The carrier phase error calculating section 38 of the error calculating section 36 calculates the carrier phase error $\theta$ by computing the phase of the subtractive value. The amplitude error calculating section 40 of the error calculating section 36 calculates the amplitude error G by computing the absolute value of the subtractive value. The error measuring section 30, which performs the above operations, can easily and precisely calculate a carrier phase error and an amplitude error, which do not include any impact from the skew.

For example, the error calculating section 36 may calculate carrier phase errors $\theta$ and amplitude errors G, for the respective frequencies of the plurality of main signal components A and the plurality of image signal components B and output the average of the carrier phase errors $\theta$ calculated for the respective frequencies and the average of the amplitude errors G calculated for the respective frequencies as the carrier phase error $\theta$ and the amplitude error G. The values of the carrier phase errors $\theta$ for the respective frequencies are generally the same and the values of the amplitude errors G for the respective frequencies are generally the same. Accordingly, the error calculating section 36 can output a carrier phase error $\theta$ and an amplitude error G that are more accurate, by averaging the carrier phase errors $\theta$ and amplitude errors G for the respective frequencies.

Figure 13:
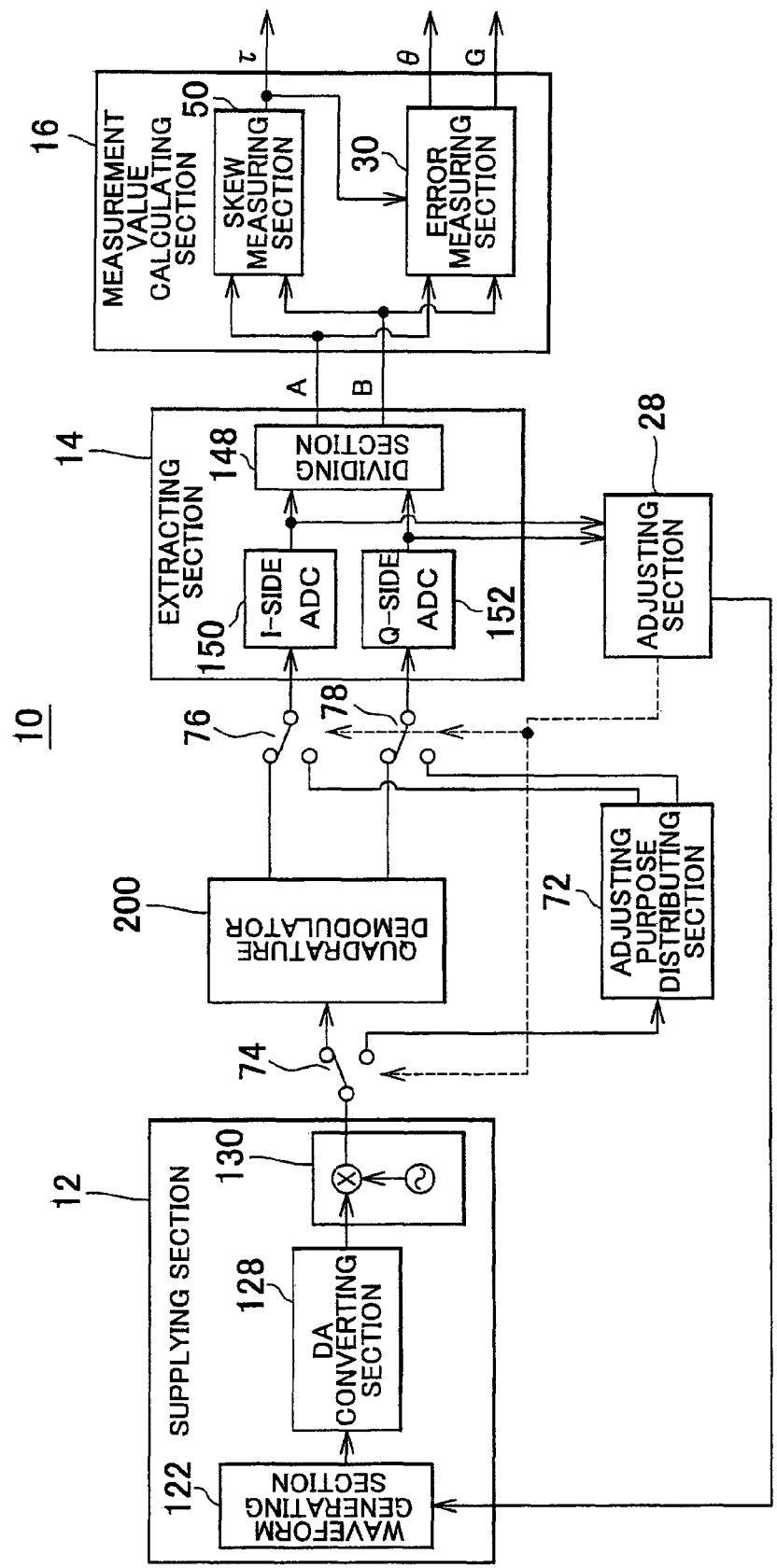
FIG. 13 shows the configuration of the measuring apparatus 10 according to a second modification of the embodiment of the present invention, together with a quadrature demodulator 200.

FIG. 13 shows the configuration of the measuring apparatus 10 according to a second modification of the present embodiment, together with a quadrature demodulator 200. Since configurations and functions of the measuring apparatus 10 according to the present modification that are given the same reference numerals as shown in FIG. 1 and FIG. 5 are generally the same as the members shown in FIG. 1 and FIG. 5 denoted by those reference numerals, explanation thereof will be omitted below, except explanation for any differences.

The measuring apparatus 10 according to the present example measures the quadrature demodulator 200, which applies quadrature demodulation to a signal input thereto by using a carrier signal having a carrier frequency and outputs an I signal and a Q signal. To be more specific, the measuring apparatus 10 according to the present example measures at least one of a carrier phase error that occurs between the I signal side and Q signal side of the quadrature demodulator 200, an amplitude error between the I signal side and Q signal side of the quadrature demodulator 200, and a skew between an I signal and a Q signal.

The measuring apparatus 10 includes a supplying section 12, an extracting section 14, a measurement value calculating section 16, an adjusting section 28, an adjusting purpose distributing section 72, an output switching section 74, and an I-side input switching section 76. The supplying section 12 supplies the quadrature demodulator 200 with a reference modulation signal obtained by applying quadrature modulation to a reference I signal having a predetermined frequency and a reference Q signal whose phase is shifted by 90 degrees from the reference I signal.

For example, the supplying section 12 may supply the quadrature demodulator 200 with a reference modulation signal obtained by applying quadrature modulation to a reference I signal ($\cos(\omega_0 t)$) and a reference Q signal ($\sin(\omega_0 t)$), which are sine waveforms having an angular frequency $\omega_0$. Further, for example, the supplying section 12 may supply the quadrature demodulator 200 with a reference modulation signal obtained by applying quadrature modulation to monotone signals or supply the quadrature demodulator 200 with a reference modulation signal obtained by applying quadrature modulation to multi-tone signals. When supplied with the reference modulation signal from the supplying section 12, the quadrature demodulator 200 outputs a demodulation signal (baseband signal) obtained by applying quadrature demodulation to the reference modulation signal.

For example, the supplying section 12 may include a waveform generating section 122, a DA converting section 128, and an up-converter 130. The waveform generating section 122 generates waveform data representing the reference modulation signal. The DA converting section 128 converts the waveform data of the reference modulation signal generated by the waveform generating section 122 from digital to analog, and outputs the reference modulation signal turned to an analog signal. The up-converter 130 up-converts the carrier frequency of the reference modulation signal output from the DA converting section 128 to the carrier frequency of the quadrature demodulator 200.

The extracting section 14 receives a demodulation signal output from the quadrature demodulator 200 as a result of applying quadrature demodulation to the reference modulation signal, from the quadrature demodulator 200. The extracting section 14 extracts a main signal component A included in the received demodulation signal, which is the result of modulating the reference IQ signals (reference I signal and reference Q signal), and an image signal component B included in the received demodulation signal, which occurs at a position symmetric to the demodulated reference IQ signals (reference I signal and reference Q signal) with respect to the carrier signal. For example, in a case where the angular frequency of the reference IQ signals is $\omega_0$, the extracting section 14 extracts a frequency component having the angular frequency $\omega_0$ in the demodulation signal output from the quadrature demodulator 200, as the main signal component A. Further, in this case, the extracting section 14 extracts a frequency component having the angular frequency $\omega_0$ in the demodulation signal output from the quadrature demodulator 200, as the image signal component B. Further, in a case where multi-tone signals are supplied to the quadrature demodulator 200, the extracting section 14 may extract a plurality of main signal components A and a plurality of image signal components B.

For example, the extracting section 14 may include an I-side ADC 150, a Q-side ADC 152, and a dividing section 148. The I-side ADC 150 samples the I signal component of the demodulation signal output from the quadrature demodulator 200, thereby to digitalize it. The Q-side ADC 152 samples the Q signal component from the demodulation signal output of the quadrature demodulator 200, thereby to digitalize it. The dividing section 148 extracts the main signal component A and the image signal component B from the demodulation signal (baseband signal) output from the I-side ADC 150 and Q-side ADC 152 as digitalized.

The measurement value calculating section 16 calculates at least one of a carrier phase error, an amplitude error, and a skew of the quadrature demodulator 200, based on the main signal component A and the image signal component B. The adjusting purpose distributing section 72 divides the reference modulation signal output from the supplying section 12 into an I-side signal and a Q-side signal through, for example, a distributor, and supplies them to the extracting section 14, during an adjustment operation performed prior to the measurement of a carrier phase error, an amplitude error, and a skew. The output switching section 74 switches the destination to where the reference modulation signal output from the supplying section 12 is to be output, between the quadrature demodulator 200 and the adjusting purpose distributing section 72. The output switching section 74 supplies the reference modulation signal to the quadrature demodulator 200 during a measurement operation, and supplies the reference modulation signal to the adjusting purpose distributing section 72 during an adjustment operation.

The I-side input switching section 76 switches the supplier of the signal to be input to the extracting section 14 between the quadrature demodulator 200 and the adjusting purpose distributing section 72. The I-side input swithcing section 76 supplies the I signal included in the demodulation signal output from the quadrature demodulator 200 to the extracting section 14 during a measurement operation, and supplies the I-side signal output from the adjusting purpose distributing section 72 to the extracting section 14 during an adjustment operation. The Q-side input switching section 78 switches the supplier of the signal to be input to the extracting section 14 between the quadrature demodulator 200 and the adjusting purpose distributing section 72. The Q-side input switching section 78 supplies the Q signal included in the demodulation signal output from the quadrature demodulator 200 to the extracting section 14 during a measurement operation, and supplies the Q-side signal output from the adjusting purpose distributing section 72 to the extracting section 14 during an adjustment operation.

The adjusting section 28 adjusts the reference modulation signal output from the supplying section 12 during an adjustment operation. For example, the adjusting section 28 adjusts the supplying section 12 such that any frequency error, phase error, amplitude error, waveform distortion, etc. of the reference modulation signal ($\text{Cos}(\omega_0 t)$) and reference Q signal ($\text{Sin}(\omega_0 t)$), which are sine waveforms having the angular frequency $\omega_0$ modulated on the reference modulation signal, become small. For example, the adjusting section 28 may adjust the reference modulation signal to be output from the supplying section 12 based on signals obtained by converting the I-side signal and Q-side signal divided by the adjusting purpose distributing section 72 from analog to digital.

As described above, the measuring apparatus 10 according to the present example can easily and precisely calculate a carrier phase error, an amplitude error, and a skew of the quadrature demodulator 200. For example, with the measuring apparatus 10, it is possible to output a carrier phase error, an amplitude error, and a skew of the quadrature demodulator 200 that are represented by numerical values, with no need for analyzing a Lissajous waveform displayed.

Figure 14:
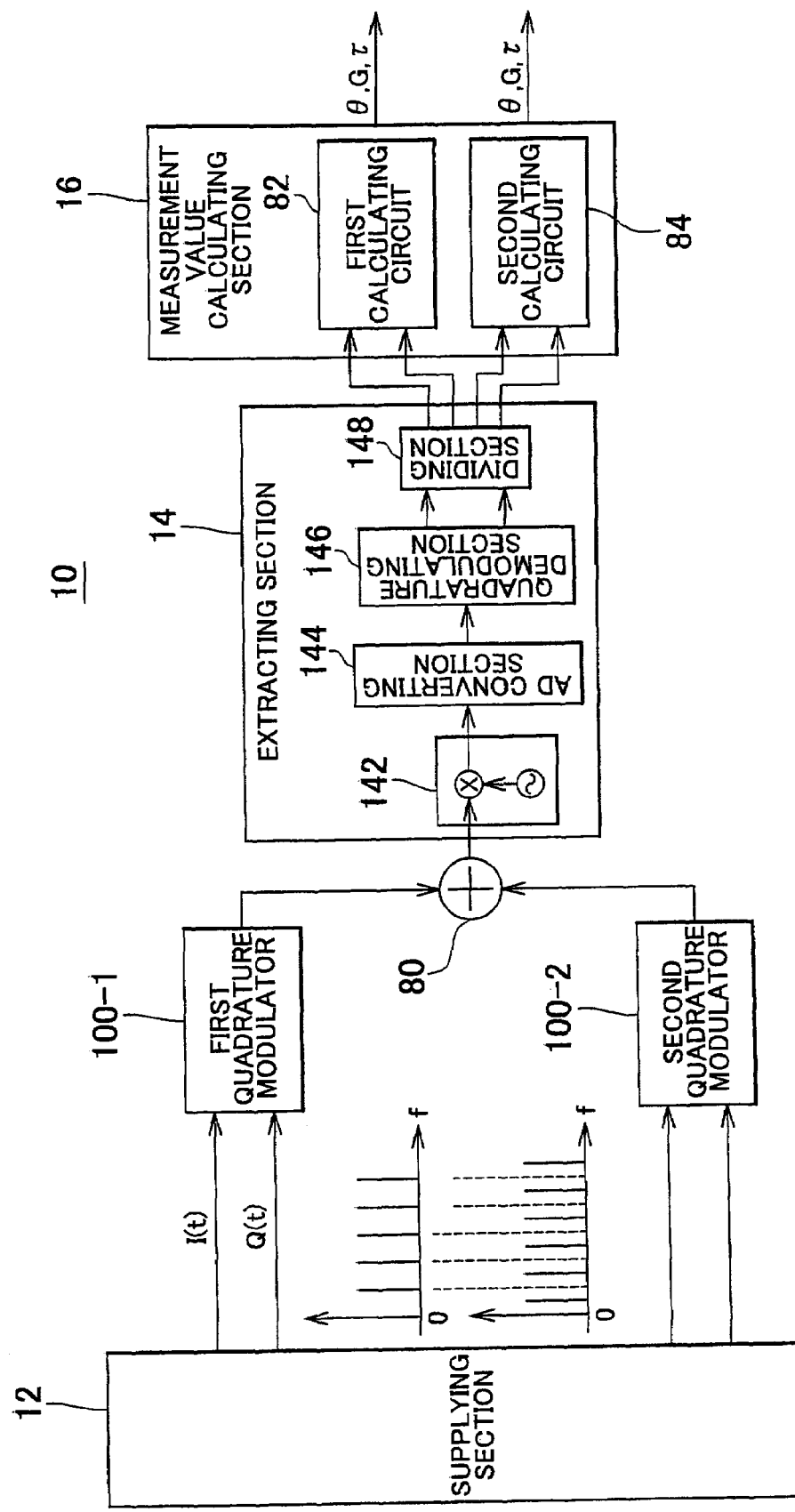
FIG. 14 shows the configuration of the measuring apparatus 10 according to a third modification of the embodiment of the present invention, together with the quadrature modulator 100.

FIG. 14 shows the configuration of the measuring apparatus 10 according to a third modification of the present embodiment, together with a quadrature modulator 100. Since configurations and functions of the measuring apparatus 10 according to the present modification that are given the same reference numerals as shown in FIG. 1 and FIG. 5 are generally the same as the members shown in FIG. 1 and FIG. 5 denoted by those reference numerals, explanation thereof will be omitted below, except explanation for any differences.

In the present modification, the measuring apparatus 10 measures a first quadrature modulator 100-1 and a second quadrature modulator 100-2 in parallel. In this case, the supplying section 12 supplies the first quadrature modulator 100-1 with reference IQ signals having a first frequency. Along with this, the supplying section 12 supplies the second quadrature modulator 100-2 with reference IQ signals having a second frequency, which, after modulated, will not overlap with a main signal and an image signal which will be generated as a result of modulating the reference IQ signals having the first frequency. For example, the supplying section 12 may supply the first quadrature modulator 100-1 with reference IQ signals having a frequency of an odd ordinal number included in multi-tone signals, and supply the second quadrature modulator 100-2 with reference IQ signals having a frequency of an even ordinal number.

Further, the measuring apparatus 10 according to the present modification further includes an adding section 80. The adding section 80 generates a combination signal obtained by adding a modulation signal output from the first quadrature modulator 100-1 as a result of applying quadrature modulation to the reference IQ signals having the first frequency and a modulation signal output from the second quadrature modulator 100-2 as a result of applying quadrature modulation to the reference IQ signals having the second frequency.

The extracting section 14 extracts a first main signal component A which is the result of modulating the reference IQ signals having the first frequency and a first image signal component B which occurs at a position symmetric to the modulated reference IQ signals having the first frequency with respect to the carrier signal, from the combination signal obtained by the adding section 80. Further, the extracting section 14 extracts a second main signal component A which is the result of modulating the reference IQ signals having the second frequency and a second image signal component B which occurs at a position symmetric to the modulated reference IQ signals having the second frequency with respect to the carrier signal.

The measurement value calculating section 16 includes a first calculating circuit 82 and a second calculating circuit 84. The first calculating circuit 82 calculates at least one of a carrier phase error $\theta$, an amplitude error G, and a skew $\tau$ in the first quadrature modulator 100-1, based on the first main signal component A and the first image signal component B. The second calculating circuit 84 calculates at least one of a carrier phase error $\theta$, an amplitude error G, and a skew $\tau$ in the second quadrature modulator 100-2, based on the second main signal component A and the second image signal component B. The first calculating circuit 82 and the second calculating circuit 84 may each include the error measuring section 30 and the skew measuring section 50 shown in FIG. 5.

The measuring apparatus 10 according to the present modification as described above can measure a plurality of quadratue modulators 100 simultaneously with one extracting section 14 and one measurement value calculating section 16. Note that the measuring apparatus 10 according to the present modification may measure a first quadrature demodulator 200-1 and a second quadrature demodulator 200-2 in parallel. In this case, the supplying section 12 supplies the first quadrature modulator 100-1 with a first reference modulation signal obtained by applying quadrature modulation to reference IQ signals having a first frequency. Along with this, the supplying section 12 supplies the second quadrature modulator 100-2 with a second reference modulation signal obtained by applying quadrature modulation to reference IQ signals having a second frequency.

Further, in this case, the adding section 80 outputs a combination signal obtained by combining a demodulation signal output from the first quadrature demodulator 200 as a result of applying quadrature demodulation to the first reference modulation signal and a demodulation signal output from the second quadrature demodulator 200 as a result of applying quadrature demodulation to the second reference modulation signal. Then, the extracting section 14 may extract a first main signal component A and a second main signal component A, and a first image signal component B and a second image signal component B, from the I signal component and Q signal component of the combination signal. Hence, a plurality of quadrature demodulators 200 can be measured simultaneously with one extracting section 14 and one measurement value calculating section 16.

Figure 15:
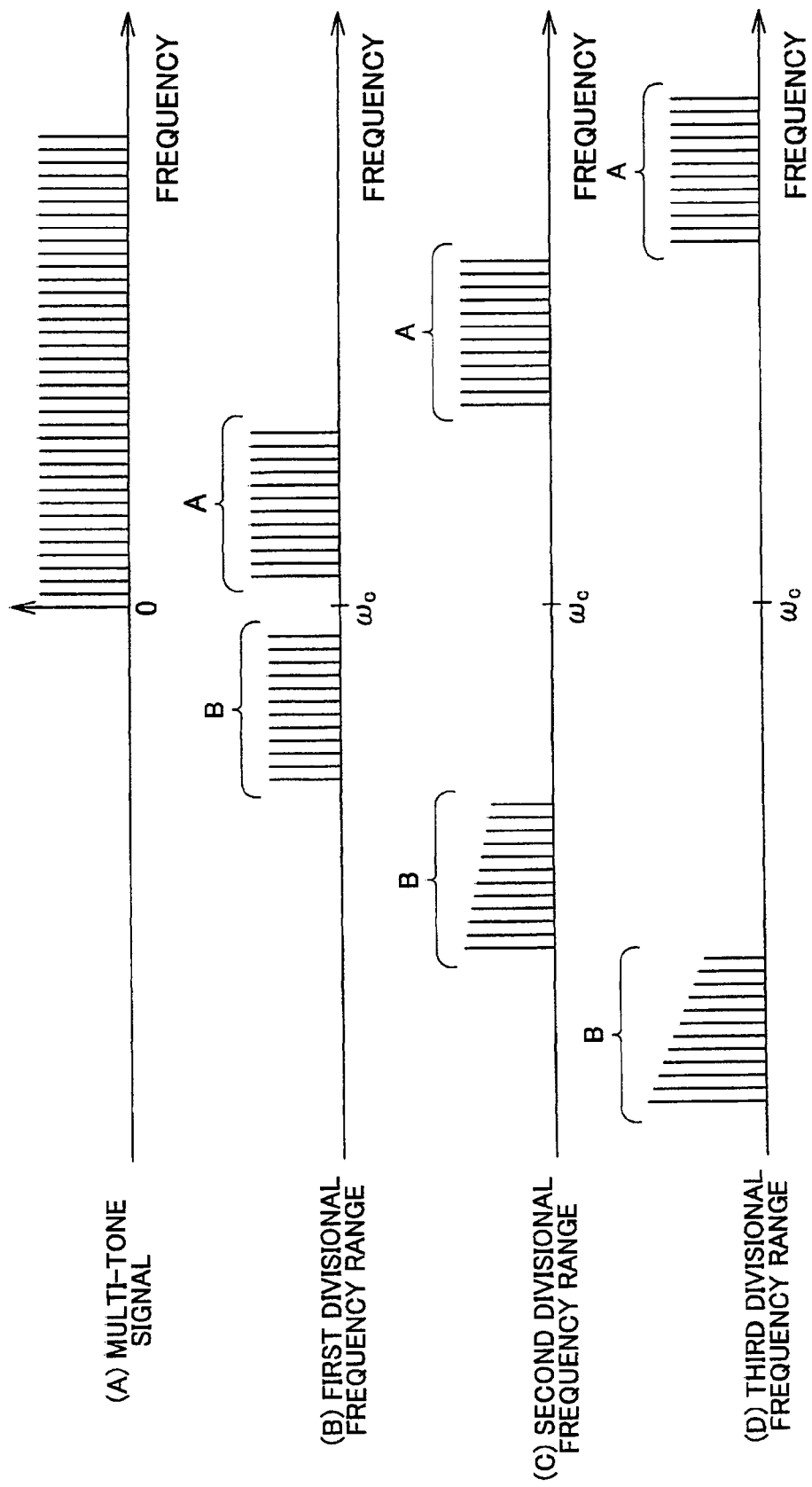
FIG. 15 shows one example of main signal components A and image signal components B which an extracting section 14 of the measuring apparatus 10 according to a fourth modification of the present embodiment extracts by frequency division.

FIG. 15 shows one example of a main signal component A and an image signal component B extracted by the extracting section 14 of the measuring apparatus 10 according to a fourth modification of the present embodiment. Since configurations and functions of the measuring apparatus 10 according to the present modification that are given the same reference numerals as shown in FIG. 1 and FIG. 5 are generally the same as the members shown in FIG. 1 and FIG. 5 denoted by those reference numerals, explanation thereof will be omitted below, except explanation for any differences.

The supplying section 12 according to the present modification supplies the quadrature modulator 100 with multi-tone signals as shown by (A) of FIG. 15. For example, the supplying section 12 may output multi-tone signals that cover the frequency range in which the quadrature modulator 100 operates.

The extracting section 14 extracts, for each divisional frequency range of a plurality of divisional frequency ranges obtained by dividing the frequency range in which the multi-tone signals are included into a plurality of regions, main signal components A as the result of modulating the reference I signals and reference Q signals included in that divisional frequency range, and image signal components B included in that divisional frequency range, as shown by (B), (C), and (D) of FIG. 15. For example, the extracting section 14 may extract main signal components A and image signal components B which are included in each divisional frequency range, by eliminating signal components other than those in the divisional frequency range concerned by a filter or the like.

Further, the supplying section 12 may sequentially supply the quadrature modulator 100 with the reference I signals and reference Q signals included in the respective divisional frequency ranges, through a plurality of steps for the respective divisional frequency ranges. Then, the extracting section 14 may sequentially extract main signal components A as the result of modulating the reference I signals and reference Q signals included in the respective divisional frequency ranges, and image signal components B included in the respective divisional frequency ranges, through a plurality of steps for the respective divisional frequency ranges.

For example, at a first step, the supplying section 12 outputs low frequency components of the multi-tone signals. Then, at a second step, the supplying section 12 outputs middle frequency components of the multi-tone signals. Then, at a third step, the supplying section 12 outputs high frequency components of the multi-tone signals. By doing so, the extracting section 14 can extract the main signal components A and the image signal components B included in the divisional frequency range concerned, without using a filter.

Then, the measurement value calculating section 16 calculates at least one of a carrier phase error, an amplitude error, and a skew for each divisional frequency range, based on the main signal components A and the image signal components B. The measuring apparatus 10 according to the present modification as above can measure the frequency characteristic of the carrier phase error, amplitude error, and skew.

Figure 16:
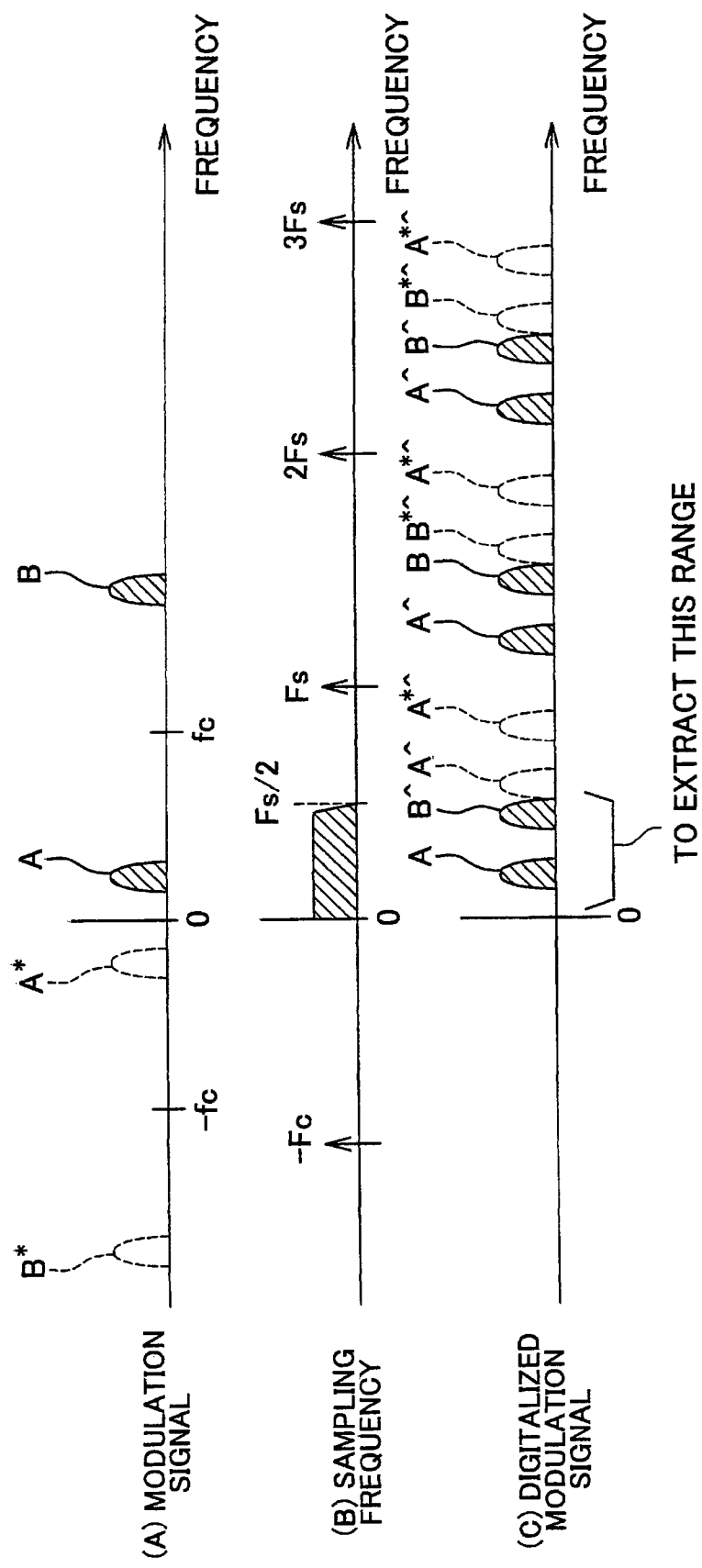
FIG. 16 shows a modulation signal input to the extracting section 14 of the measuring apparatus 10 according to a fifth modification of the present embodiment, and the modulation signal digitalized.

FIG. 16 shows a modulation signal input to the extracting section 14 of the measuring apparatus 10 according to a fifth modification of the present embodiment and the modulation signal digitalized. Since configurations and functions of the measuring apparatus 10 according to the present modification that are given the same reference numerals as shown in FIG.

1 and FIG. 5 are generally the same as the members shown in FIG. 1 and FIG. 5 denoted by those reference numerals, explanation thereof will be omitted below, except explanation for any differences.

In the present modification, the extracting section 14 includes a down-converter 142 and an AD converting section 144. The down-converter 142 down-converts the carrier frequency of a modulation signal output from the quadrature modulator 100 to an intermediate frequency. Here, the down-converter 142 down-converts the modulation signal such that both its main signal component A and its image signal component B are included in positive frequency ranges, as shown by (A) of FIG. 16. Hence, the extracting section 14 can extract a main signal component A and an image signal component B from the down-converted modulation signal.

The modulation signal output from the quadrature modulator 100 includes an alias A* of the main signal component and an alias B* of the image signal component in negative frequency ranges, as shown by (A) of FIG. 16. The alias A* of the main signal component is represented by the complex conjugate of the main signal component A, and occurs at a position symmetric to the main signal component A with respect to the frequency 0. The alias B* of the image signal component is represented by the complex conjugate of the main signal component B and occurs at a position symmetric to the main signal component B with respect to the frequency 0.

The AD converting section 144 samples the modulation signal output from the down-converter 142 by a sampling frequency Fs as shown by (B) of FIG. 16, thereby to digitalize it. That is, the AD converting section 144 samples and digitalizes the modulation signal including the main signal component A and image signal component B in positive frequency ranges.

Here, as shown by (C) of FIG. 16, the digitalized modulation signal includes the real component A of the main signal component, the alias A* of the main signal component, over- and under-sampled components A^ of the real component of the main signal component A, and over- and under-sampled components A*^ of the alias of the main signal component. Further, the digitalized modulation signal includes the real component B of the image signal component, the alias B* of the image signal component, over- and under-sampled components B^ of the real component of the image signal component, and over- and under-sampled components B*^ of the alias of the image signal component.

Hence, the extracting section 14 extracts any one of the real component A of the main signal component, the alias A* of the main signal component, the over- and under-sampled components A^ of the real component of the main signal component, and the over- and under-sampled components A*^ of the alias of the main signal component, which are included in the digitalized modulation signal, and outputs it as the main signal component A. Further, the extracting section 14 extracts any one of the real component B of the image signal component, the alias B* of the image signal component, the over- and under-sampled components B^ of the real component of the image signal component, and the over- and under-sampled components B*^ of the alias of the image signal component, which are included in the digitalized modulation signal, and outputs it as the image signal component B.

Note that the AD converting section 144 samples and digitalizes the modulation signal by the sampling frequency Fs which is different from the carrier frequency fc in the modulation signal. Further, the AD converting section 144 samples and digitalizes the modulation signal by the sampling frequency Fs which will not allow the real component A of the main signal component to overlap any of the over- and under-sampled components B* and B*^ of the real component and alias of the image signal component.

Further, in a case where the alias * of the main signal component or the over- or under-sampled component A*^ of the alias of the main signal component is extracted, the extracting section 14 outputs the complex conjugate of the extracted component as the main signal component A. Further, in a case where the alias B* of the image signal component or the over- or under-sampled component B*^ of the alias of the image signal component is extracted, the extracting section 14 outputs the complex conjugate of the extracted component as the image signal component B.

The extracting section 14 according to the present modification as described above can use a frequency lower than ½ of the frequency range of the main signal component A or image signal component B, as the sampling frequency Fs of the AD converting section 144. Therefore, the extracting section 14 according to the present modification can use a low sampling frequency Fs even when sampling a modulation signal in which the difference between the frequency of the main signal component A and that of the image signal component B is large as shown by (C) of FIG. 15.

Figure 17:
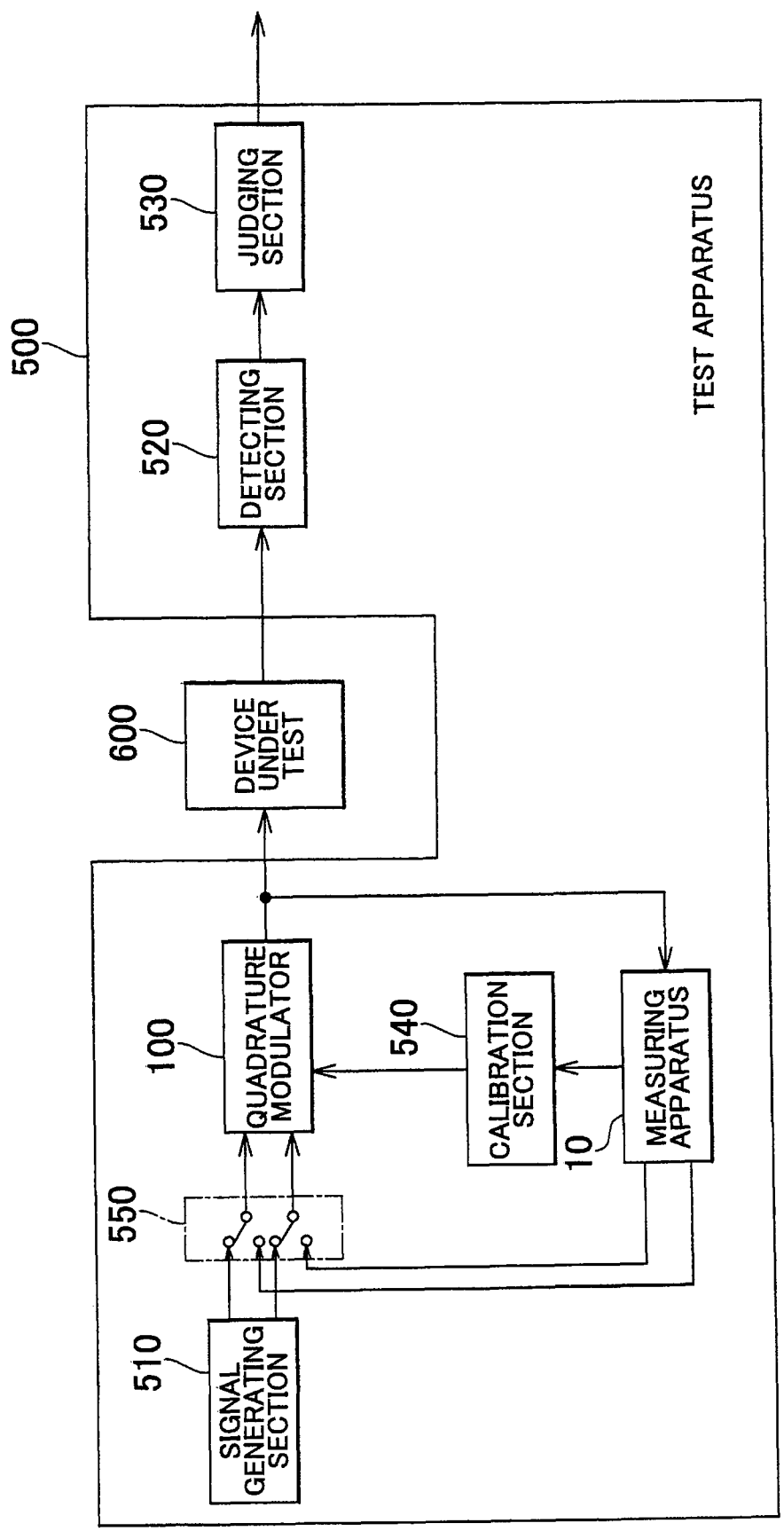
FIG. 17 shows a first example of the configuration of a test apparatus 500 according to the embodiment of the present invention, together with a device under test 600.

FIG. 17 shows a first example of the configuration of a test apparatus 500 according to the embodiment of the present invention, together with a device under test 600. The test apparatus 500 according to the present example includes a signal generating section 510, a quadrature modulator 100, a detecting section 520, a judging section 530, a measuring apparatus 10, a calibration section 540, and a first switching section 550, and tests the device under test 600.

The signal generating section 510 generates an I signal and a Q signal which are to be supplied to the quadrature modulator 100 as test signals. The signal generating section 510 supplies the generated I signal and Q signal to the quadrature modulator 100.

The quadrature modulator 100 supplies the device under test 600 with a quadrature modulation signal obtained by applying quadrature modulation to the I signal and Q signal input thereto, by a carrier signal having a carrier frequency. The detecting section 520 detects an output signal output from the device under test 600 in response to that the quadrature modulation signal is supplied thereto from the quadrature modulator 100. The judging section 530 judges whether the output signal detected by the detecting section 520 is a pass or a failure.

The measuring apparatus 10 measures at least one of a carrier phase error, an amplitude error, and a skew of the quadrature modulator 100, during calibration performed before the device under test 600 is tested. The measuring apparatus 10 has the same configuration and functions as those of the measuring apparatus 10 shown in FIG. 1 or FIG. 5. That is, the measuring apparatus 10 supplies a reference I signal and a reference Q signal to the quadrature modulator 100, and receives a modulation signal to be output from the quadrature modulator 100 as a result of applying quadrature modulation to the reference I signal and reference Q signal, thereby to measure the quadrature modulator 100.

The calibration section 540 calibrates the quadrature modulator 100 according to the measurement by the measuring apparatus 10. For example, the calibration section 540 may correct the quadrature modulator 100 such that a carrier phase error, an amplitude error, and a skew of the quadrature modulator 100 become small. Further, for example, the calibration section 540 may calculate a correcting value for removing any impact of a carrier phase error, an amplitude error, and a skew of the quadrature modulator 100 from the judgment given by the judging section 530, and store this correcting value. In this case, for example, the calibration section 540 may correct the phase angle of a demodulation signal produced by the device under test 600 according to the carrier phase error measured by the measuring apparatus 10, and correct the amplitude of the demodulation signal produced by the device under test 600 according to the amplitude error measured by the measuring apparatus 10. Further, the calibration section 540 may correct the phase angle of the demodulation signal produced by the device under test 600 by an angle corresponding to the skew measured by the measuring apparatus 10.

The first switching section 550 switches the supplier of an I signal and a Q signal to be supplied to the quadrature modulator 100, between a testing operation and a calibration operation. The first switching section 550 supplies an I signal and a Q signal generated by the signal generating section 510 to the quadrature modulator 100 during a testing operation, and supplies a reference I signal and a reference Q signal output from the measuring apparatus 10 to the quadrature modulator 100 during a calibration operation. The test apparatus 500 having this configuration can calibrate the quadrature modulator 100 precisely. Hence, the test apparatus 500 can test the device under test 600 precisely.

Figure 18:
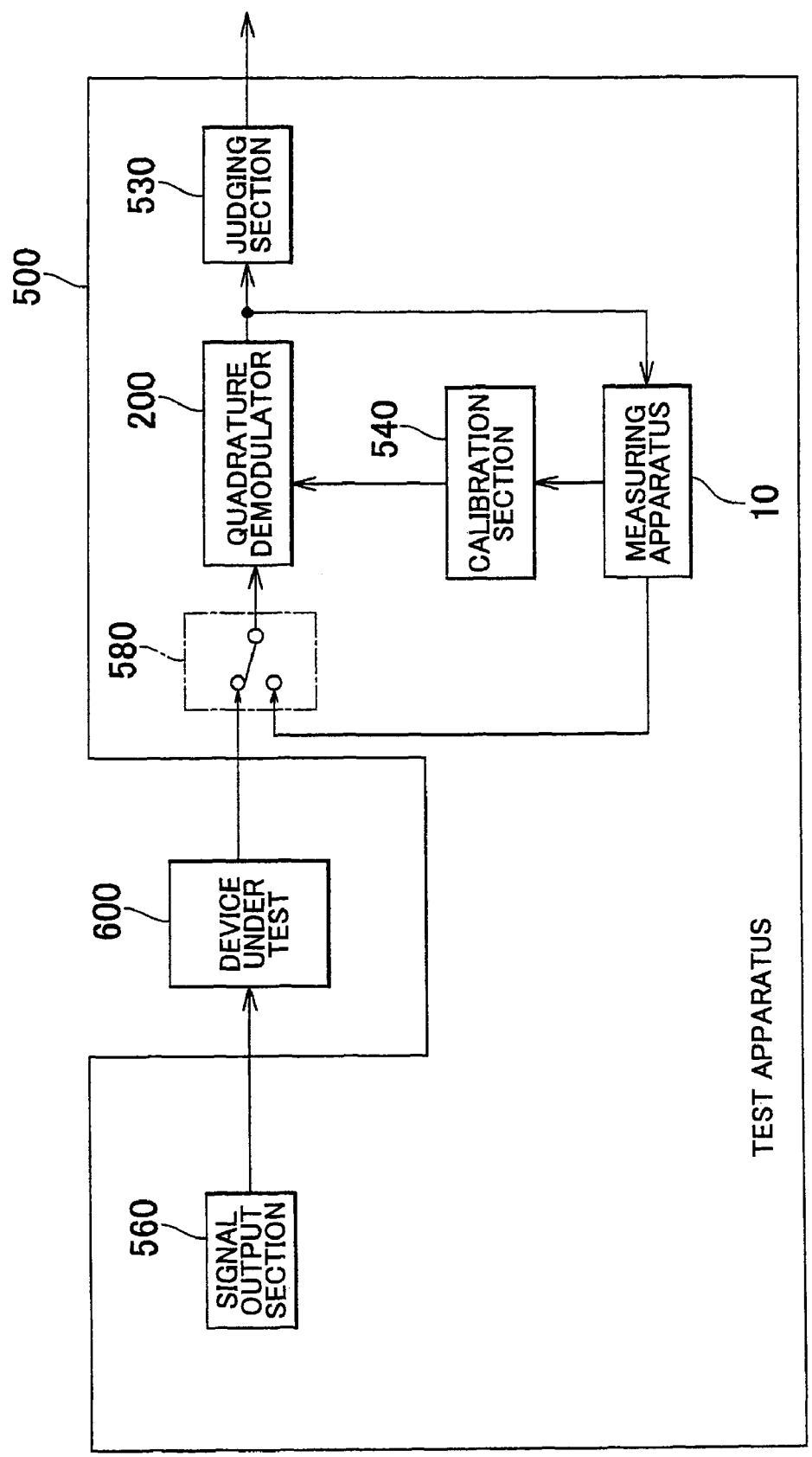
FIG. 18 shows a second example of the configuration of the test apparatus 500 according to the embodiment of the present invention, together with a device under test 600.

FIG. 18 shows a second example of the configuration of the test apparatus 500 according to the embodiment of the present invention, together with a device under test 600. The test apparatus 500 according to the present example, includes a signal output section 560, a quadrature demodulator 200, a judging section 530, a measuring apparatus 10, a calibration section 540, and a second switching section 580, and tests a device under test 600.

The signal output section 560 outputs a test signal to the device under test 600 to let the device under test 600 output an output signal obtained by applying quadrature modulation to the test signal. The quadrature demodulator 200 applies quadrature demodulation to the output signal output from the device under test 600 in response to the test signal, by a carrier signal having a carrier frequency, thereby to output an I signal and a Q signal. The judging section 530 judges whether the I signal and Q signal output from the quadrature demodulator 200 are a pass or a failure.

The measuring apparatus 10 measures at least one of a carrier phase error, an amplitude error, and a skew of the quadrature demodulator 200 during a calibration operation performed before the device under test 600 is tested. The measuring apparatus 10 has the same configuration and functions as those of the measuring apparatus 10 shown in FIG. 13. That is, the measuring apparatus 10 supplies a reference modulation signal obtained by applying quadrature modulation to a reference I signal and a reference Q signal to the quadrature demodulator 200, and receives a demodulation signal output from the quadrature demodulator 200 as a result of applying quadrature demodulation to the reference modulation signal, thereby to measure the quadrature demodulator 200.

The calibration section 540 calibrates the quadrature demodulator 200 according to the measurement by the measuring apparatus 10. For example, the calibration section 540 may correct the quadrature demodulator 200 such that a carrier phase error, an amplitude error, and a skew of the quadrature demodulator 200 become small. Further, for example, the calibration section 540 may calculate a correcting value for removing any impact of a carrier phase error, an amplitude error, and a skew of the quadrature demodulator 200 from the judgment by the judging section 530, and store this correcting value. In this case, for example, the calibration section 540 may correct the phase angle of the demodulation signal produced by the quadrature demodulator 200 according to a carrier phase error measured by the measuring apparatus 10, and correct the amplitude of the demodulation signal produced by the quadrature demodulator 200 according to an amplitude error measured by the measuring apparatus 10. Further, the calibration section 540 may correct the phase angle of the demodulation signal produced by the quadrature demodulator 200 by an angle corresponding to a skew measured by the measuring apparatus 10.

The second switching section 580 switches the supplier of the modulation signal to be supplied to the quadrature demodulator 200, between a testing operation and a calibration operation. The second switching section 580 supplies a demodulation signal output from the device under test 600 to the quadrature demodulator 200 during a testing operation, and supplies a reference modulation signal output from the measuring apparatus 10 to the quadrature demodulator 200 during a calibration operation. The test apparatus 500 having this configuration can precisely calibrate the quadrature demodulator 200. Hence, the first switching section 550 can precisely test the device under test 600.

Figure 19:
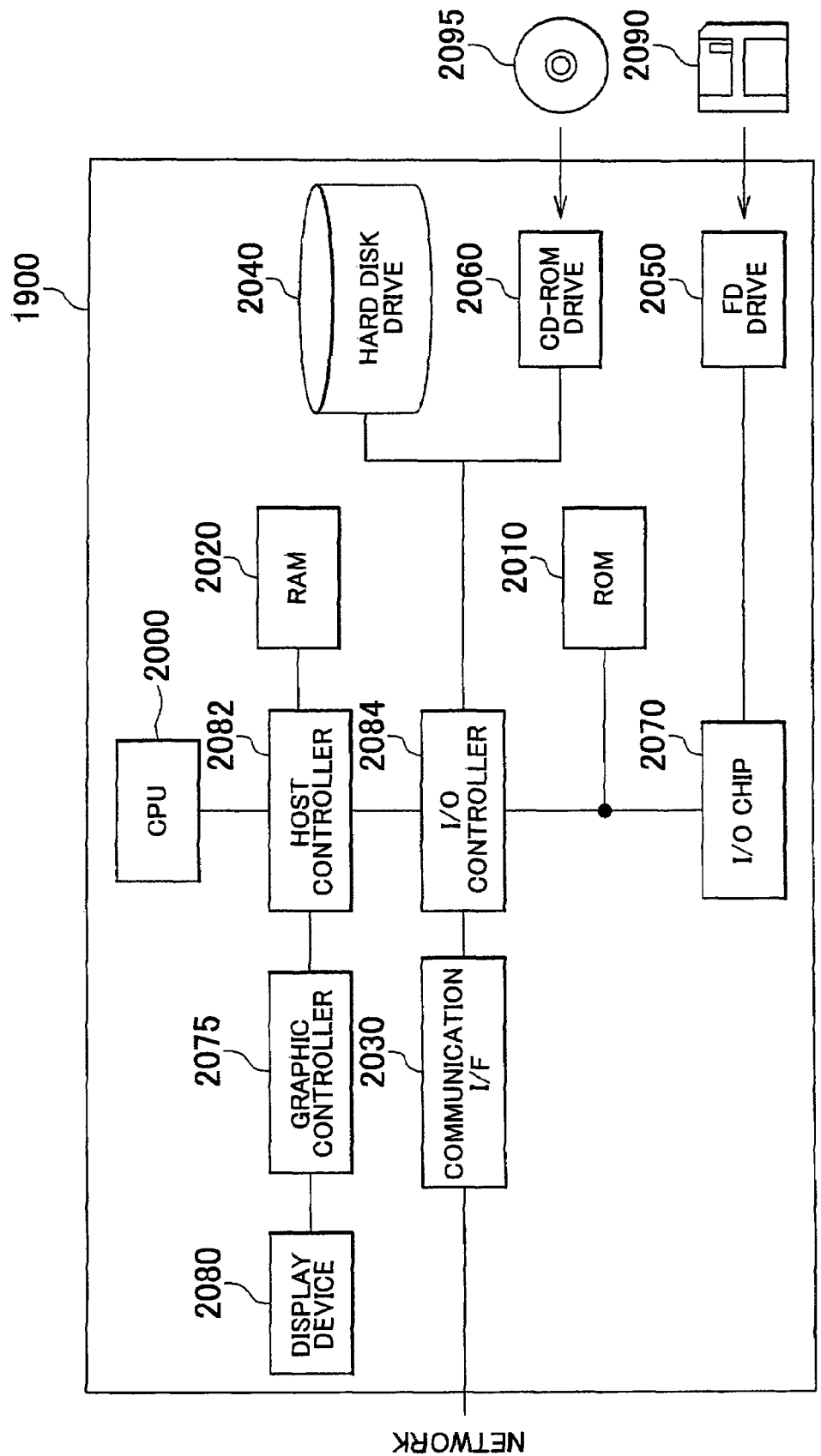
FIG. 19 shows one example of the hardware configuration of a computer 1900 according to the embodiment of the present invention.

FIG. 19 shows one example of the hardware configuration of a computer 1900 according to the present embodiment. The computer 1900 according to the present embodiment includes a CPU peripheral section including a CPU 2000, a RAM 2020, a graphic controller 2075, and a display device 2080 which are connected to one another via a host controller 2082, an input/output section including a communication interface 2030, a hard disk drive 2040, and a CD-ROM drive 2060 which are connected to the host controller 2082 via an input/output controller 2084, and a legacy input/output section including a ROM 2010, a flexible disk drive 2050, and an input/output chip 2070 which are connected to the input/output controller 2084.

The host controller 2082 connects the RAM 2020 to the CPU 2000 and graphic controller 2075 which access the RAM 2020 at a high transfer rate. The CPU 2000 operates based on programs stored on the ROM 2010 and the RAM 2020, and controls each section. The graphic controller 2075 acquires image data generated by the CPU 2000 or the like on a frame buffer provided in the RAM 2020, and displays the image on the display device 2080. Instead of this, the graphic controller 2075 may include therein a frame buffer in which image data generated by the CPU 2000 or the like is stored.

The input/output controller 2084 connects the host controller 2082 to the communication interface 2030, the hard disk drive 2040, and the CD-ROM drive 2060, which are input/output devices of a relatively high transfer rate. The communication interface 2030 communicates with other devices through a network. The hard disk drive 2040 stores programs and data to be used by the CPU 2000 of the computer 1900. The CD-ROM drive 2060 reads out programs or data from a CD-ROM 2095, and provides them to the hard disk drive 2040 via the RAM 2020.

Further, input/output devices having a relatively low transfer rate, such as the ROM 2010, a flexible disk drive 2050, and the input/output chip 2070 are connected to the input/output controller 2084. The ROM 2010 stores a boot program to be executed when the computer 1900 is to be activated, programs specific to the hardware of the computer 1900, etc. The flexible disk drive 2050 reads out programs or data from the flexible disk 2090, and provides them to the hard disk drive 2040 via the RAM 2020. The input/output chip 2070 functions as the interface for various input/output devices by means of the flexible disk drive 2050, and, for example, a parallel port, a serial port, a keyboard port, a mouse port, etc.

Any program to be provided to the hard disk drive 2040 via the RAM 2020 is provided by the user as stored on a recording medium such as the flexible disk 2090, the CD-ROM 2095, an IC card, etc. The program is read out from the recording medium, installed on the hard disk drive 2040 in the computer 1900 via the RAM 2020, and executed by the CPU 2000.

A program installed on the computer 1900 to control the computer 1900 to function as the measuring apparatus 10 includes a supplying module, an extracting module, a measurement value calculating module, an I-side output switching module, a Q-side output switching module, an input switching module, and an adjusting module. These program and modules act on the CPU 2000 and the like to cause the computer 1900 to function as the supplying section 12, the extracting section 14, the measurement value calculating section 16, the adjusting purpose combining section 20, and the adjusting section 28 respectively.

The program and modules described above may be stored on an external recording medium. As the recording medium, an optical recording medium such as a DVD, a CD, etc., a magneto-optical recording medium such as an MO, etc., a tape medium, a semiconductor memory such as an IC card, etc. can be used, as well as the flexible disk 2090 and the CD-ROM 2095. Further, a storage device such as a hard disk, a RAM, etc. provided in a server system connected to a private-use communication network or the Internet may be used as the recording medium to provide the program to the computer 1900 via the network.

One aspect of the present invention has been described above by using an embodiment, but the technical scope of the present invention is not limited to the scope of disclosure of the above-described embodiment. Various modifications or alterations can be made upon the above-described embodiment. It is obvious from the statements of the claims that embodiments to which such modifications or alterations are made upon can also be included in the technical scope of the present invention.

What is claimed is:

1. A measuring apparatus which measures a quadrature modulator for applying quadrature modulation to an I (in-phase) signal and a Q (quadrature phase) signal input thereto by a carrier signal having a carrier frequency, the measuring apparatus comprising:

a supplying section which supplies the quadrature modulator with a reference I (in-phase) signal having a predetermined frequency and a reference Q (quadrature phase) signal whose phase is shifted by 90 degrees from the reference I (in-phase) signal;

an extracting section which extracts, from a modulation signal output from the quadrature modulator as a result of applying quadrature modulation to the reference I (in-phase) signal and the reference Q (quadrature phase) signal, a main signal component which is a result of modulating the reference I (in-phase) signal and the reference Q (quadrature phase) signal, and an image signal component which occurs at a position symmetric to the modulated reference I (in-phase) signal and reference Q (quadrature phase) signal with respect to the carrier signal; and a measurement value calculating section comprising a processor which calculates at least one of a carrier phase error which occurs between an I (in-phase) signal side and a Q (quadrature phase) signal side of the quadrature modulator, an amplitude error between the I (in-phase) signal side and the Q (quadrature phase) signal side of the quadrature modulator, and a skew between an I (in-phase) signal and a Q (quadrature phase) signal of the quadrature modulator based on the main signal component and the image signal component, wherein the measurement value calculating section includes:

a correcting value calculating section which adds the main signal component and the image signal component to calculate a correcting value which is not dependent on the carrier phase error or the amplitude error;

a correcting value dividing section which calculates a divisional value obtained by dividing at least one of the main signal component and the image signal component by the correcting value; and an error calculating section which calculates at least one of the carrier phase error and the amplitude error based on the divisional value.

2. The measuring apparatus according to claim 1, wherein the supplying section supplies the quadrature modulator with a plurality of reference I signals having different frequencies from each other, and a plurality of reference Q signals whose phase is shifted by 90 degrees from the plurality of reference I signals respectively, the extracting section extracts, from a modulation signal output from the quadrature modulator as a result of applying quadrature modulation to the reference I signals and the reference Q signals, a plurality of main signal components which are results of modulating the plurality of reference I signals and the plurality of reference Q signals, and a plurality of image signal components which occur at positions symmetric to the plurality of reference I signals modulated and the plurality of reference Q signals modulated with respect to the carrier signal, and the measurement value calculating section includes a skew calculating section which calculates the skew based on a main signal differential component obtained by differentiating the plurality of main signal components with respect to frequency and an image signal differential component obtained by differentiating the plurality of image signal components with respect to frequency.

3. The measuring apparatus according to claim 2, wherein the measurement value calculating section further includes:

an modifying section which outputs adjusted main signal components and adjusted image signal components obtained by adjusting the main signal components and the image signal components according to the skew respectively;

a correcting value calculating section which adds the adjusted main signal components and the adjusted image signal components to calculate a correcting value which is not dependent on the carrier phase error or the amplitude error;

a first correcting value dividing section which calculates main component divisional values obtained by dividing the main signal components by the correcting value;

a second correcting value dividing section which calculates image component divisional values obtained by dividing the image signal components by the correcting value;

a subtracting section which calculates a subtractive value obtained by subtracting the main component divisional values and the image component divisional values; and an error calculating section which calculates at least one of the carrier phase error and the amplitude error based on the subtractive value.

4. The measuring apparatus according to claim 2, wherein the supplying section supplies the quadrature modulator with a plurality of reference I signals and a plurality of reference Q signals which are distributed in a frequency range on a positive side with respect to the carrier signal and in a frequency range on a negative side with respect to the carrier signal, and which have such frequencies as not to allow each of these signals after modulated to overlap a main signal and an image signal of the others of these signals after modulated.

5. The measuring apparatus according to claim 1, which is for measuring a first quadrature modulator and a second quadrature modulator in parallel, wherein
the supplying section supplies the first quadrature modulator with a reference I signal and reference Q signal having a first frequency, and supplies the second quadrature modulator with a reference I signal and reference Q signal having a second frequency which, after modulated, will not overlap with a main signal and an image signal which will be generated as a result of modulating the reference I signal and reference Q signal having the first frequency,
the measuring apparatus further includes an adding section which generates a combination signal obtained by adding a modulation signal output from the first quadrature modulator as a result of applying quadrature modulation to the reference I signal and reference Q signal having the first frequency and a modulation signal output from the second quadrature modulator as a result of applying quadrature modulation to the reference I signal and reference Q signal having the second frequency,
the extracting section extracts, from the combination signal, a first main signal component which is a result of modulating the reference I signal and reference Q signal having the first frequency, a first image signal component which occurs at a position symmetric to the modulated reference I signal and reference Q signal having the first frequency with respect to the carrier signal, a second main signal component which is a result of modulating the reference I signal and reference Q signal having the second frequency, and a second image signal component which occurs at a position symmetric to the modulated reference I signal and reference Q signal having the second frequency with respect to the carrier signal, and
the measurement value calculating section comprising a processor calculates at least one of a carrier phase error, an amplitude error, and a skew of the first quadrature modulator based on the first main signal component and the first image signal component, and calculates at least one of a carrier phase error, an amplitude error, and a skew of the second quadrature modulator based on the second main signal component and the second image signal component.

6. The measuring apparatus according to claim 1, wherein
the supplying section supplies the quadrature modulator with a plurality of reference I signals having different frequencies from each other, and a plurality of reference Q signals whose phase is shifted by 90 degrees from the plurality of reference I signals respectively,
the extracting section extracts, from a modulation signal output from the quadrature modulator as a result of applying quadrature modulation to the reference I signals and the reference Q signals, a plurality of main signal components which are results of modulating the plurality of reference I signals and the plurality of reference Q signals, and a plurality of image signal components which occur at positions symmetric to the plurality of reference I signals modulated and the plurality of reference Q signals modulated with respect to the carrier signal, and
the measurement value calculating section comprising a processor calculates carrier phase errors and amplitude errors for the respective frequencies of the plurality of main signal components and the plurality of image signal components, and outputs an average of the calculated carrier phase errors for the respective frequencies and an average of the calculated amplitude errors for the respective frequencies, as a carrier phase error and an amplitude error.

7. The measuring apparatus according to claim 1, wherein
the supplying section supplies the quadrature modulator with a plurality of reference I signals having different frequencies from each other and a plurality of reference Q signals whose phase is shifted by 90 degrees from the plurality of reference I signals respectively,
the extracting section extracts, for each of a plurality of divisional frequency ranges obtained by dividing a frequency range, in which the plurality of reference I signals and the plurality of reference Q signals are included, into a plurality of regions, the main signal component as the result of modulating the reference I signal and the reference Q signal included in that divisional frequency range, and the image signal component included in that divisional frequency range, and
the measurement value calculating section comprising a processor calculates at least one of the carrier phase error, the amplitude error, and the skew, for each divisional frequency range, based on the main signal component and the image signal component.

8. The measuring apparatus according to claim 7, wherein
the supplying section supplies the quadrature modulator with the reference I signals and the reference Q signals included in the respective divisional frequency ranges, from those included in one divisional frequency range to another sequentially, and
the extracting section extracts the main signal component as the result of modulating the reference I signal and the reference Q signal included in each divisional frequency range and the image signal component included in each divisional frequency range, for each of the plurality of divisional frequency ranges sequentially.

9. The measuring apparatus according to claim 1, wherein
the extracting section samples and digitalizes the modulation signal which includes the main signal component and the image signal component in a positive frequency range, and
extracts the main signal component and the image signal component from the digitalized modulation signal.

10. The measuring apparatus according to claim 9, wherein
the extracting section samples the modulation signal by a sampling frequency different from the carrier frequency in the modulation signal, thereby to digitalize the modulation signal,
extracts any one of a real component of the main signal component, an alias of the main signal component, and an over-sampled component and under-sampled component of each of the real component and alias of the main signal component, which are included in the digitalized modulation signal, and outputs it as the main signal component, and extracts any one of a real component of the image signal component, an alias of the image signal component, and an over-sampled component and under-sampled component of each of the real component and alias of the image signal component, which are included in the digitalized modulation signal, and outputs it as the image signal component.

11. The measuring apparatus according to claim 10, wherein
the extracting section samples the modulation signal by a sampling frequency which does not allow the real component of the main signal component to overlap any of the over-sampled components and under-sampled components of the real component and alias of the image signal component, thereby to digitalize the modulation signal.

12. The measuring apparatus according to claim 10, wherein
in a case where the alias of the main signal component, or the over-sampled component or the under-sampled component of the alias of the main signal component is extracted, the extracting section outputs a complex conjugate of the extracted component as the main signal component, and
in a case where the alias of the image signal component, or the over-sampled component or the under-sampled component of the alias of the image signal component is extracted, the extracting section outputs a complex conjugate of the extracted component as the image signal component.

13. A measuring apparatus which measures a quadrature demodulator for outputting an I (in-phase) signal and a Q (quadrature phase) signal by applying quadrature demodulation to an input signal by a carrier signal having a carrier frequency, the measuring apparatus comprising:
a supplying section which supplies the quadrature demodulator with a reference modulation signal obtained by applying quadrature modulation to a reference I (in-phase) signal having a predetermined frequency and a reference Q (quadrature phase) signal whose phase is shifted by 90 degrees from the reference I (in-phase) signal;
an extracting section which extracts, from a demodulation signal output from the quadrature demodulator as a result of applying quadrature demodulation to the reference modulation signal, a main signal component which is a result of modulating the reference I (in-phase) signal and the reference Q (quadrature phase) signal, and an image signal component which occurs at a position symmetric to the reference I (in-phase) signal demodulated and the reference Q (quadrature phase) signal demodulated with respect to the carrier signal; and
a measurement value calculating section comprising a processor which calculates at least one of a carrier phase error which occurs between an I (in-phase) signal side and a Q (quadrature phase) signal side of the quadrature demodulator, an amplitude error between the I (in-phase) signal side and the Q (quadrature phase) signal side of the quadrature demodulator, and a skew between an I (in-phase) signal and a Q (quadrature phase) signal of the quadrature demodulator based on the main signal component and the image signal component, wherein
the measurement value calculating section includes:
a correcting value calculating section which adds the main signal component and the image component to calculate a correcting value which is not dependent on the carrier phase error or the amplitude error;
a correcting value dividing section which calculates a divisional value obtained by dividing at least one of the main signal component and the image signal component by the correcting value; and
an error calculating section which calculates at least one of the carrier phase error and the amplitude error based on the divisional value.

14. A measuring method for measuring a quadrature modulator which applies quadrature modulation to an I (in-phase) signal and a Q (quadrature phase) signal input thereto by a carrier signal having a carrier frequency, the measuring method comprising:
supplying the quadrature modulator with a reference I (in-phase) signal having a predetermined frequency and a reference Q (quadrature phase) signal whose phase is shifted by 90 degrees from the reference I (in-phase) signal;
extracting, from a modulation signal output from the quadrature modulator as a result of applying quadrature modulation to the reference I (in-phase) signal and the reference Q (quadrature phase) signal, a main signal component which is a result of modulating the reference I (in-phase) signal and the reference Q (quadrature phase) signal, and an image signal component which occurs at a position symmetric to the modulated reference I (in-phase) signal and reference Q (quadrature phase) signal with respect to the carrier signal; and
calculating at least one of a carrier phase error which occurs between an I fin-phase) signal side and a Q (quadrature phase) signal side of the quadrature modulator, an amplitude error between the I (in-phase) signal side and the Q (quadrature phase) signal side of the quadrature modulator, and a skew between an I (in-phase) signal and a Q (quadrature phase) signal of the quadrature modulator, based on the main signal component and the image signal component, wherein
the calculating step includes:
adding the main signal component and the image signal component to calculate a correcting value which is not dependent on the carrier phase error or the amplitude error;
calculating a divisional value obtained by dividing at least one of the main signal component and the image signal component by the correcting value; and
calculating at least one of the carrier phase error and the amplitude error based on the divisional value.

15. A measuring method for measuring a quadrature demodulator which outputs an I (in-phase) signal and a Q (quadrature phase) signal by applying quadrature demodulation to an input signal by a carrier signal having a carrier frequency, the measuring method comprising:
supplying the quadrature demodulator with a reference modulation signal obtained by applying quadrature modulation to a reference I (in-phase) signal having a predetermined frequency and a reference Q (quadrature phase) signal whose phase is shifted by 90 degrees from the reference I (in-phase) signal;
extracting, from a demodulation signal output from the quadrature demodulator as a result of applying quadrature demodulation to the reference modulation signal, a main signal component which is a result of modulating the reference I (in-phase) signal and the reference Q (quadrature phase) signal, and an image signal component which occurs at a position symmetric to the reference I (in-phase) signal demodulated and the reference Q (quadrature phase) signal demodulated with respect to the carrier signal; and calculating at least one of a carrier phase error which occurs between an I (in-phase) signal side and a Q (quadrature phase) signal side of the quadrature demodulator, an amplitude error between the I (in-phase) signal side and the Q (quadrature phase) signal side of the quadrature demodulator, and a skew between an I (in-phase) signal and a Q (quadrature phase) signal of the quadrature demodulator, based on the main signal component and the image signal component, wherein the calculating step includes:

adding the main signal component and the image signal component to calculate a correcting value which is not dependent on the carrier phase error or the amplitude error;

calculating a divisional value obtained by dividing at least one of the main signal component and the image signal component by the correcting value; and calculating at least one of the carrier phase error and the amplitude error based on the divisional value.

16. A non-transitory recording medium storing a program for controlling a computer to function as a measuring apparatus which measures a quadrature modulator for applying quadrature modulation to an I (in-phase) signal and a Q (quadrature phase) signal input thereto by a carrier signal having a carrier frequency, the program controlling the computer to function as a measuring apparatus comprising:

a supplying section which supplies the quadrature modulator with a reference I (in-phase) signal having a predetermined frequency and a reference Q (quadrature phase) signal whose phase is shifted by 90 degrees from the reference I (in-phase) signal;

an extracting section which extracts, from a modulation signal output from the quadrature modulator as a result of applying quadrature modulation to the reference I (in-phase) signal and the reference Q (quadrature phase) signal, a main signal component which is a result of modulating the reference I (in-phase) signal and the reference Q (quadrature phase) signal, and an image signal component which occurs at a position symmetric to the modulated reference I (in-phase) signal and reference Q (quadrature phase) signal with respect to the carrier signal; and a measurement value calculating section comprising a processor which calculates at least one of a carrier phase error which occurs between an I (in-phase) signal side and a Q (quadrature phase) signal side of the quadrature modulator, an amplitude error between the I (in-phase) signal side and the Q (quadrature phase) signal side of the quadrature modulator, and a skew between an I (in-phase) signal and a Q (quadrature phase) signal of the quadrature modulator, based on the main signal component and the image signal component, wherein the measurement value calculating section includes:

a correcting value calculating section which adds the main signal component and the image signal component to calculate a correcting value which is not dependent on the carrier phase error or the amplitude error;

a correcting value dividing section which calculates a divisional value obtained by dividing at least one of the main signal component and the image signal component by the correcting value; and an error calculating section which calculates at least one of the carrier phase error and the amplitude error based on the divisional value.

17. A non-transitory recording medium storing a program for controlling a computer to function as a measuring apparatus which measures a quadrature demodulator for outputting an I (in-phase) signal and a Q (quadrature phase) signal by applying quadrature demodulation to an input signal by a carrier signal having a carrier frequency, the program controlling the computer to function as a measuring apparatus comprising:

a supplying section which supplies the quadrature demodulator with a reference modulation signal obtained by applying quadrature modulation to a reference I (in-phase) signal having a predetermined frequency and a reference Q (quadrature phase) signal whose phase is shifted by 90 degrees from the reference I (in-phase) signal;

an extracting section which extracts, from a demodulation signal output from the quadrature demodulator as a result of applying quadrature demodulation to the reference modulation signal, a main signal component which is a result of modulating the reference I (in-phase) signal and the reference Q (quadrature phase) signal, and an image signal component which occurs at a position symmetric to the reference I (in-phase) signal demodulated and the reference Q (quadrature phase) signal demodulated with respect to the carrier signal; and a measurement value calculating section comprising a processor which calculates at least one of a carrier phase error which occurs between an I (in-phase) signal side and a Q (quadrature phase) signal side of the quadrature demodulator, an amplitude error between the I (in-phase) signal side and the Q (quadrature phase) signal side of the quadrature demodulator, and a skew between an I (in-phase) signal and a Q (quadrature phase) signal of the quadrature demodulator, based on the main signal component and the image signal component, wherein the measurement value calculating section includes:

a correcting value calculating section which adds the main signal component and the image signal component to calculate a correcting value which is not dependent on the carrier phase error or the amplitude error;

a correcting value dividing section which calculates a divisional value obtained by dividing at least one of the main signal component and the image signal component by the correcting value; and an error calculating section which calculates at least one of the carrier phase error and the amplitude error based on the divisional value.

18. A test apparatus which tests a device under test, comprising:

a quadrature modulator which supplies the device under test with a quadrature modulation signal obtained by applying quadrature modulation to an I (in-phase) signal and a Q (quadrature phase) signal input to the quadrature modulator by a carrier signal having a carrier frequency;

a detecting section which detects an output signal output from the device under test in response to the quadrature modulation signal;

a judging section which judges whether the output signal detected by the detecting section is a pass or a failure;

a measuring apparatus which measures the quadrature modulator; and a calibration section which calibrates the quadrature modulator according to a measurement by the measuring apparatus, wherein the measuring apparatus includes:

a supplying section which supplies the quadrature modulator with a reference I (in-phase) signal having a predetermined frequency and a reference Q (quadrature phase) signal whose phase is shifted by 90 degrees from the reference I (in-phase) signal;

an extracting section which extracts, from a modulation signal output from the quadrature modulator as a result of applying quadrature modulation to the reference I (in-phase) signal and the reference Q (quadrature phase) signal, a main signal component which is a result of modulating the reference I (in-phase) signal and the reference Q (quadrature phase) signal, and an image signal component which occurs at a position symmetric to the modulated reference I (in-phase) signal and reference Q (quadrature phase) signal with respect to the carrier signal; and a measurement value calculating section comprising a processor which calculates at least one of a carrier phase error which occurs between an I (in-phase) signal side and a Q (quadrature phase) signal side of the quadrature modulator, an amplitude error between the I (in-phase) signal side and the Q (quadrature phase) signal side of the quadrature modulator, and a skew between an I (in-phase) signal and a Q (quadrature phase) signal of the quadrature modulator based on the main signal component and the image signal component, wherein the measurement value calculating section includes:

a correcting value calculating section which adds the main signal component and the image signal component to calculate a correcting value which is not dependent on the carrier phase error or the amplitude error;

a correcting value dividing section which calculates a divisional value obtained by dividing at least one of the main signal component and the image signal component by the correcting value; and an error calculating section which calculates at least one of the carrier phase error and the amplitude error based on the divisional value.

19. A test apparatus which tests a device under test, comprising:

a signal output section which outputs a test signal to the device under test to cause the device under test to output an output signal which is a result of applying quadrature modulation to the test signal;

a quadrature demodulator which outputs an I (in-phase) signal and a Q (quadrature phase) signal by applying quadrature demodulation by a carrier signal having a carrier frequency to the output signal output from the device under test in response to the test signal;

a judging section which judges whether the I (in-phase) signal and the Q (quadrature phase) signal output from the quadrature demodulator are a pass or a failure;

a measuring apparatus which measures the quadrature demodulator; and a calibration section which calibrates the quadrature demodulator according to a measurement by the measuring apparatus, wherein the measuring apparatus includes:

a supplying section which supplies the quadrature demodulator with a reference modulation signal obtained by applying quadrature modulation to a reference I (in-phase) signal having a predetermined frequency and a reference Q (quadrature phase) signal whose phase is shifted by 90 degrees from the reference I (in-phase) signal;

an extracting section which extracts, from a demodulation signal output from the quadrature demodulator as a result of applying quadrature demodulation to the reference modulation signal, a main signal component which is a result of modulating the reference I (in-phase) signal and the reference Q (quadrature phase) signal, and an image signal component which occurs at a position symmetric to the reference I (in-phase) signal demodulated and the reference Q signal demodulated with respect to the carrier signal; and a measurement value calculating section comprising a processor which calculates at least one of a carrier phase error which occurs between an I (in-phase) signal side and a Q (quadrature phase) signal side of the quadrature demodulator, an amplitude error between the I (in-phase) signal side and the Q (quadrature phase) signal side of the quadrature demodulator, and a skew between an I (in-phase) signal and a Q (quadrature phase) signal of the quadrature demodulator, based on the main signal component and the image signal component, wherein the measurement value calculating section includes:

a correcting value calculating section which adds the main signal component and the image signal component to calculate a correcting value which is not dependent on the carrier phase error or the amplitude error;

a correcting value dividing section which calculates a divisional value obtained by dividing at least one of the main signal component and the image signal component by the correcting value; and an error calculating section which calculates at least one of the carrier phase error and the amplitude error based on the divisional value.

* * * * *